United States Patent
Miyazaki

[11] Patent Number: 6,138,505
[45] Date of Patent: Oct. 31, 2000

[54] WHEEL ACTION FORCE DETECTOR FOR DETECTING AXLE FORCES ABSENT BRAKE TORQUE

[75] Inventor: Nagao Miyazaki, Osaka, Japan

[73] Assignee: Japan Electronics Industry, Limited, Osaka, Japan

[21] Appl. No.: 09/327,206

[22] Filed: Jun. 7, 1999

Related U.S. Application Data

[63] Continuation of application No. 08/744,887, Nov. 8, 1996, which is a continuation of application No. 08/396,183, Feb. 24, 1995, abandoned, which is a continuation of application No. 07/947,206, Sep. 18, 1992, abandoned, which is a continuation-in-part of application No. 07/667,939, Mar. 12, 1991, Pat. No. 5,186,042.

[30] Foreign Application Priority Data

Mar. 19, 1990 [JP] Japan ........................................ 2-69461
May 11, 1990 [JP] Japan ...................................... 2-125658

[51] Int. Cl.$^7$ .................................................. G01M 17/02
[52] U.S. Cl. ................................................................ 73/146
[58] Field of Search ............................... 73/118.1, 862.66, 73/862.041, 862.628, 862.04, 146

[56] References Cited

U.S. PATENT DOCUMENTS 3,620,074  11/1971  Laimins et al. ..................... 73/862.628
5,186,042  2/1993  Miyazaki ............................ 73/862.628

*Primary Examiner*—William Oen
*Attorney, Agent, or Firm*—Jordan and Hamburg LLP

[57] ABSTRACT

A device for measuring action force of a wheel includes a vehicle axle upon which the wheel is mounted, the vehicle axle having a stress neutral line, and a stress detecting sensor having at least one strain gauge. The stress detecting sensor is disposed within the vehicle axle so as to detect at least one of a horizontal shear stress and a vertical sheer stress with the at least one strain gauge being one of aligned with or proximate the stress neutral line thereby permitting substantial removal of axle torque influence from an output of the stress detecting sensor. A signal processing circuit processes the output of the stress detecting sensor.

1 Claim, 23 Drawing Sheets

WHEEL ACTION FORCE DETECTOR FOR DETECTING AXLE FORCES ABSENT BRAKE TORQUE

REFERENCE TO RELATED APPLICATIONS

This is a continuation of Ser. No. 08/744,887, filed Nov. 8, 1996, which is a continuation of Ser. No. 08/396,183, filed Feb. 24, 1995, now abandoned which is a continuation of Ser. No. 07/947,206, filed Sep. 18, 1992, now abandoned which is a continuation-in-part of Ser. No. 07/667,939, filed Mar. 12, 1991 now U.S. Pat. No. 5,186,042.

BACKGROUND OF THE INVENTION

1. Technical Field

The present invention relates to a device for measuring action force of a wheel for detecting road surface frictional force, vertical drag, road surface friction coefficient, etc. which can be a constituent element of a brake system with skid control for preventing lock (seizure) of the wheels of a vehicle on sudden stops or a traction control system for preventing excessive slip of the wheels at acceleration, and a device for measuring stress of a structure for measuring stresses produced in other structures.

2. Prior Art

The antilock brake system (ABS) of the conventional vehicle such as an automobile generally employs the principle of controlling the brake action automatically according to the chassis speed and wheel speed in such a manner that the slip ratio will fall with a certain range [cf. Japanese Patent Publication No. 59-30585 and Japanese Kokai Patent Publication No. 60-61354). The relationship between road surface friction coefficient and slip ratio is variable according to road surface condition. Therefore, in the above-mentioned system, the braking force may not be maximal depending on road surface condition and the minimum braking distance cannot be obtained in such cases. Furthermore, since the chassis speed is estimated from the wheel speed, control of the slip ratio is deficient in precision. Exact determination of the chassis speed requires a complicated apparatus such as a ground-relative speed sensor (cf. Japanese Kokai Patent Publication No. 63-64861), a chassis deceleration sensor (cf. Japanese Kokai Patent Publication No. 63-170157) or the like.

There was accordingly proposed an ABS which takes into account the road surface frictional force or road surface friction coefficient as a measured value. In the system described in Japanese Kokai Patent Publication No. 63-25169, the torque (tire torque) of the road surface frictional force acting on the wheels is calculated from the wheel angular acceleration and brake fluid pressure and the beginning of decline in tire torque during the incremental phase of brake fluid pressure is adopted as one of the criteria for assessment of the wheel condition immediately before lock. However, in this system, the tire torque is indirectly determined by arithmetic operation from the wheel angular acceleration and brake fluid pressure but because of indefinite constants such as the wheel inertia efficiency and the braking efficiency of the brake, the precision of calculated values is not sufficiently high. Claimed to overcome the above problem, an ABS characterized by direct measurement of road surface frictional force or road surface friction coefficient has been proposed (cf. Japanese Patent Application No. 2-24819 filed by the same assignee).

Regarding the traction control system, too, the conventional apparatus detects the wheel slip at acceleration by measuring the wheel speed just as the ABS. In this case, too, there is the same problem as in the ABS wherein control is based on the wheel speed.

There is a demand for an apparatus for measuring dynamic quantities relating to the interaction between the road surface and the wheel such as road surface frictional force, vertical drag and road surface friction coefficient as a constituent of the new ABS or traction control system.

SUMMARY OF THE INVENTION

The object of the present invention is to meet the above demand and provide a device for measuring action force of a wheel for detecting the road surface frictional force, vertical drag and road surface friction coefficient and a structure stress measuring apparatus for measuring stresses generated in other structures.

The present invention provides a wheel action force measuring apparatus comprising a stress detection sensor securely mounted in a hole provided in a vehicle axle through a spacer means and a signal processing circuit adapted to process a detection signal from the stress detection sensor.

In this device, the stress generated in the axle by the wheel action force is detected by the stress detection sensor installed through the spacer means. The stress is proportional to the wheel action force and, therefore, the stress detection sensor detects the wheel action force through the stress. Since the stress detection sensor is embedded in the axle, interferences to the sensor output signal from wheel action forces other than the target wheel action force can be decreased and, moreover, the sensor can be protected against the external environment. Furthermore, since the detection signal from the stress detection sensor is processed by the signal processing circuit, interference from wheel action forces other than the specific wheel action force subjected to measurement can be further decreased.

In the above device for measuring action force of a wheel, the hole in the axle can be disposed in alignment with the stress neutral line of the axle. By so doing, interference to the sensor output signals from the brake torque, side force, etc. can be effectively decreased. In the above-mentioned device for measuring action force of a wheel, the stress detection sensor can be disposed on the centerline of the axle, whereby interference to the sensor output signal from the brake torque, side force, etc. acting on the wheel can be decreased.

Furthermore, the present invention provides a device for measuring action force of a wheel comprising a plurality of stress detection sensor independently securely embedded in a plurality of holes in a vehicle axle through respective spacer means and a signal processing circuit adapted to process a detection signal from each of the stress detection sensors to extract a specified stress. By the above arrangement, a specified action force among various wheel action forces such as road surface frictional force, vertical drag, brake torque, side force, etc. can be measured, with influences of the other action forces being decreased.

In any of the above wheel action measuring apparatuses, the detection sensor and signal processing circuit can be securely installed together in the hole in the axle. Therefore, a high signal-to-noise ratio can be achieved in the output signal from the signal processing circuit.

Furthermore, the present invention provides a device for measuring action force of a wheel comprising a stress detection sensor securely installed in each of holes formed in horizontal and vertical directions in the axle through a spacer means and a signal processing circuit adapted to process a detection signal from each of said stress detection sensors. In this arrangement, the road surface frictional force and vertical drag acting on the wheel can be measured by the stress detection sensors and the detection signal from each of the stress detection sensors can be processed in a signal processing circuit to measure the road surface friction coefficient which is defined as the ratio between road surface frictional force and vertical drag.

In any of the devices for measuring action force of a wheel mentioned above, the stress detection sensor can be constructed as an integral unit comprising strain gauges mounted on a cubic plastic base. In this arrangement, the stress detection sensors can measure the road surface frictional force and vertical drag acting on the wheel in generally the same position within the axle. Thus, the stress detection sensors can be installed in a position within the axle where interferences to the two measured values from the wheel action forces other than the wheel action forces can be simultaneously decreased.

In any of the devices for measuring action force of a wheel mentioned above, the stress detection sensor can be constructed as an integral unit comprising strain gauges mounted on a planar part at one end of a bar-shaped structure. In this arrangement, the stress detection sensor can be easily embedded in a predetermined position and in a predetermined orientation within the hole.

In any of the above devices for measuring action force of a wheel, the stress detection sensor can be constructed as an integral unit comprising strain gauges mounted on a ceramic substrate and covered up with an oxide film. In this arrangement, a highly heat-resistant stress detection sensor can be constituted.

In any of the devices for measuring action force of a wheel mentioned above, strain gauges of each of the stress detection sensors can be securely mounted in the hole in the axle in an orientation of about 45° with respect to the horizontal and vertical stress center axes of the axle. Therefore, the respective sensors can measure the road surface frictional force and vertical drag acting on the wheel, with interferences from other wheel action forces being decreased.

Furthermore, the present invention provides a device for measuring action force of a wheel comprising an auxiliary stress detection sensor for detecting the brake torque etc. as disposed in the vicinity of a main stress sensor within a hole formed in a vehicle axle and a signal processing circuit for processing stress detection signals from these sensors to thereby eliminate or decrease brake torque and other strain signals.

The present invention further provides a device for measuring stress of a structure comprising a stress detection sensor securely mounted in a hole formed in a structure to be measured for stress through a spacer means and a signal processing circuit for processing detection signals from the stress detection sensor.

Because of this arrangement, stresses in any desired position inclusive of the interior of the structure can be measured.

In any of the devices for measuring action force of a wheel mentioned above, the signal processing circuit can be constituted of a sensor bridge circuit for stress detection and an amplification circuit. In this arrangement, interference from wheel action forces other than a specific wheel action force can be effectively eliminated and, in addition, the sensitivity of the stress detection sensor be increased so that a sufficiently large output of the measured wheel action force can be obtained.

In any of the devices for measuring action force of a wheel mentioned above, the signal processing circuit can be constituted of a sensor bridge circuit for stress detection, an amplification circuit and an operational circuit. In this arrangement, interference from wheel action forces other than the specific wheel action force can be effectively eliminated and the sensitivity of the stress detection sensor be increased, with the result that it is not only possible to obtain a measured value of the desired wheel action force as a sufficiently large output but also possible to determine the road surface friction coefficient which is defined as the ratio between road surface frictional force and vertical drag.

In any of the wheel action measuring devices mentioned above, the signal processing circuit can be constituted of a sensor bridge circuit for stress detection.

The effects of the present invention are as follows.

With the device according to the invention, the road surface frictional force, vertical drag, road surface friction coefficient, side force, brake torque, drive torque, etc. can be easily measured and, when the device is utilized in an antilock brake system, the braking distance can be reduced as much as possible regardless of road surface condition and, at the same time, the object of antilock can be accomplished. Moreover, there is no need for a complicated apparatus for measuring the chassis speed. In the traction control device, the acceleration distance can be reduced as much as possible regardless of road surface condition. Thus, the present invention brings forth remarkable improvements in the performance of a vehicle antilock brake system and a traction control device.

Furthermore, with the device of the present invention, any load, torque or the like can be expediently measured.

In accordance with the present invention, the technology for measuring stresses, loads or the like with a stress detection sensor equipped with strain gauges embedded in an optional structure offers the effect that, by positioning the stress detection sensor in a suitable orientation in a hole, any desired stress, load or the like can be measured. Moreover, by placing a plurality of stress detection sensors in suitable positions and orientations, overlapping stresses or loads can be eliminated or decreased and the necessary stress or load be extracted and measured. Furthermore, this stress measuring device has an additional advantage that the stresses generated internally in an object structure can be easily measured.

PREFERRED EMBODIMENTS OF THE INVENTION

The following are preferred embodiments of the invention and should by no means be construed as limiting the scope of the invention as defined in the claims.

Figure 1:
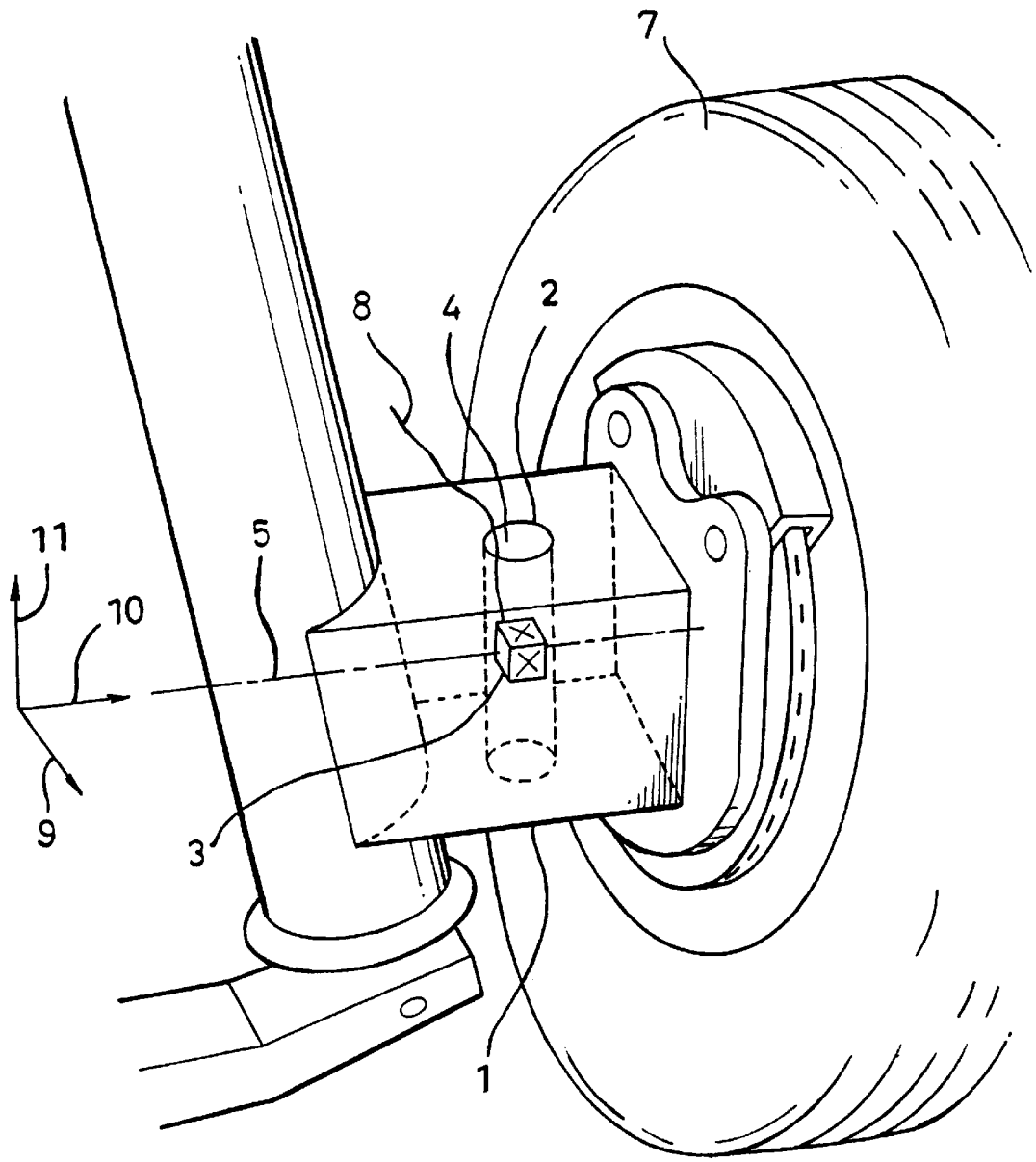
FIG. 1 is a partial perspective view showing an example of the device for measuring action force of a wheel according to the invention.
Figure 2:
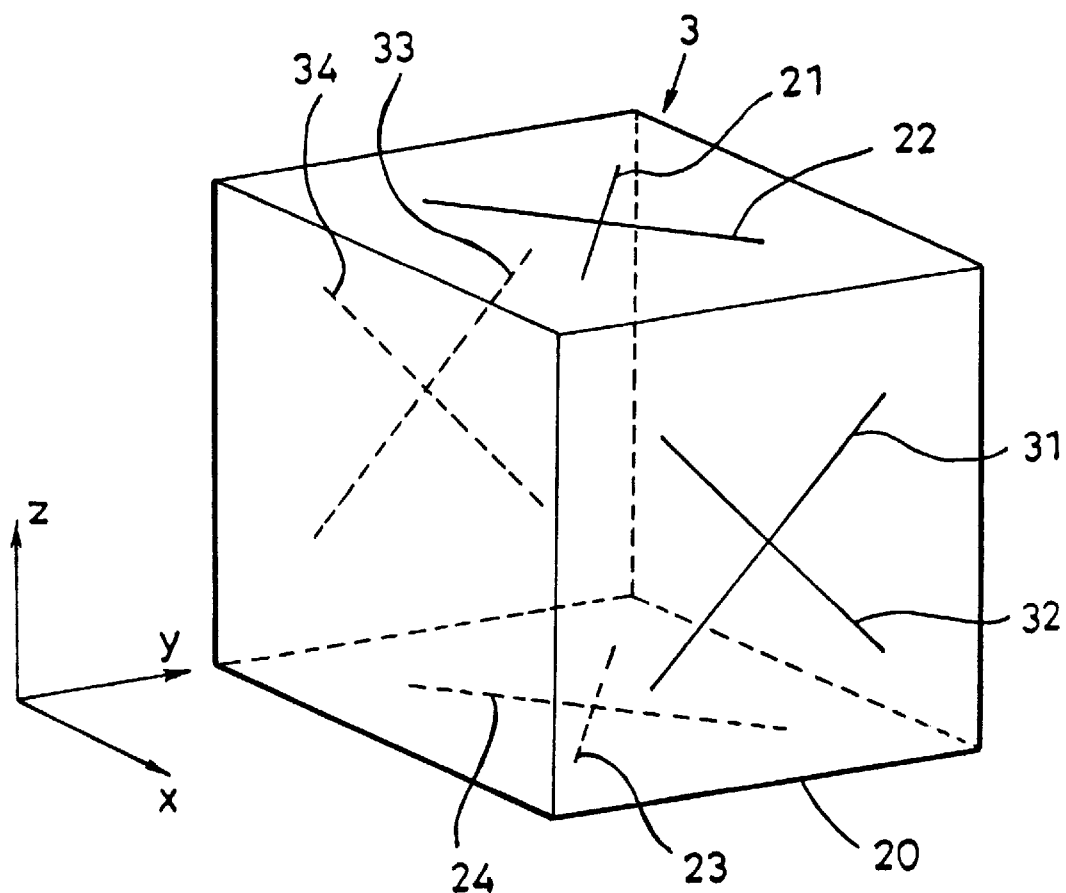
FIG. 2 is a partial perspective view showing an example of the stress detection sensor of the device for measuring action force of a wheel according to the invention.
Figure 3:
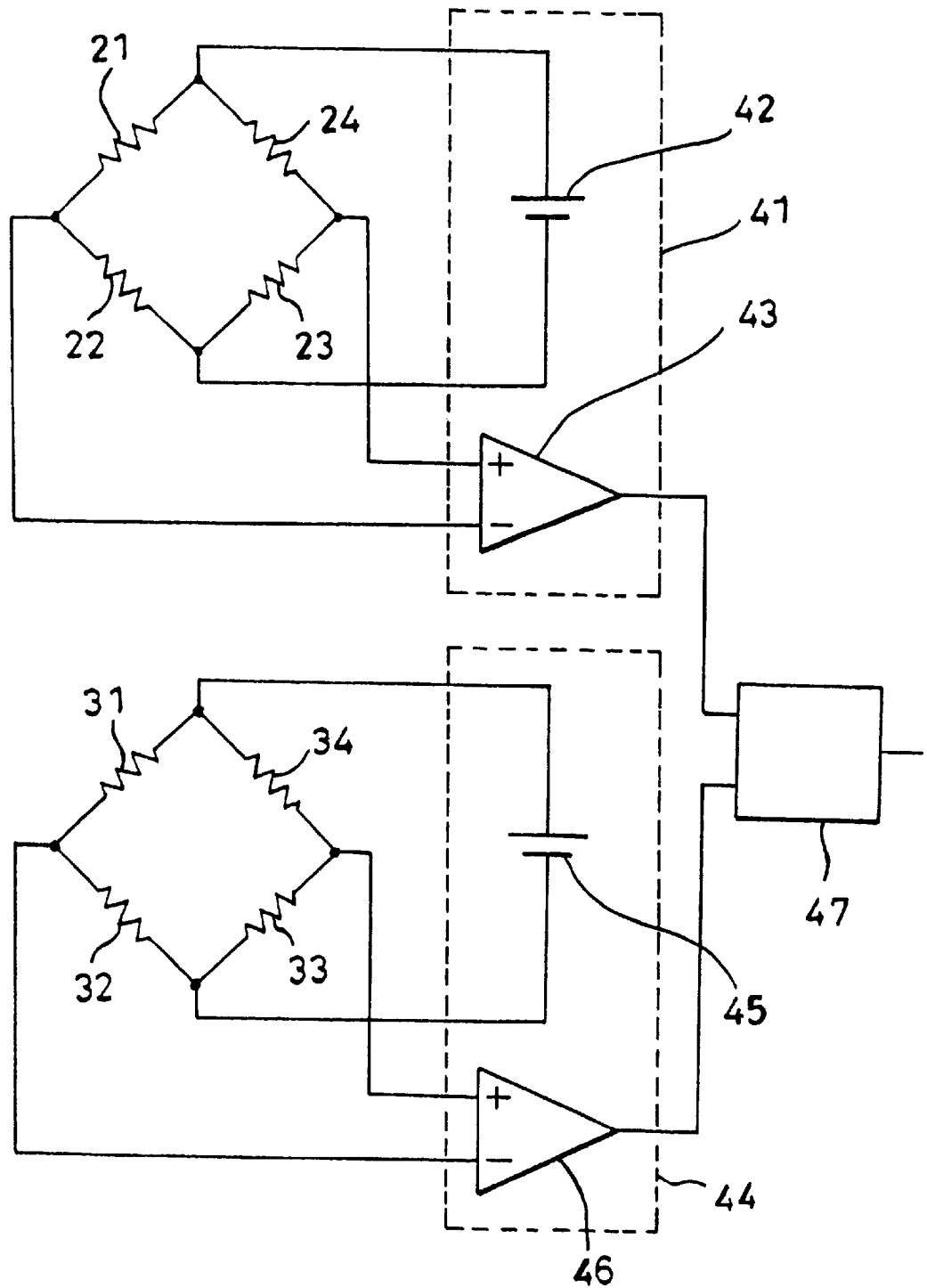
FIG. 3 is a diagrammatic view showing an example of the signal processing circuit of the device for measuring action force of a wheel according to the invention.

Specific examples of the device for measuring action force of a wheel for measuring the road surface friction coefficient are shown in FIGS. 1, 2 and 3. FIG. 1 shows the installation state of a stress detection sensor. FIG. 2 shows a stress detection sensor and FIG. 3 shows a signal processing circuit. As an example, there is shown the case in which the stress detection sensor is mounted in the axle of a driven wheel of a car having the strut type suspension structure which is often used in automobiles. From the top to the bottom of an axle (a knuckle in this example), a hole 2 is formed along a direction 11 perpendicular to the road surface and intersecting the centerline (stress neutral line) of the axle. The diameter of the hole 2 may for example be about 5 mm to about 10 mm. Here, the axle centerline (stress neutral line) means the centerline of the bending deformation generated in the axle 1 by the road surface frictional force, vertical drag and side force acting on the wheel rotating about a spindle (the line on which neither a tensile strain nor a compressive strain occurs due to bending deformation), or the centerline of a torsional deformation which is generated in the axle 1 by the brake torque on actuation of the brake (the line on which no shear strain is generated by torsional deformation). These centerlines approximately coincide with the centerline of the spindle (the center axis 5 of the axle). A stress detection sensor 3 is inserted into the hole 2. As shown in FIG. 2, the stress detection sensor 3 comprises a cubic base 20 and strain measuring means mounted thereon. The strain measuring means may for example be strain gauges. As illustrated, strain gauges 21–24 and 31–34 are represented by lines on respective planes of the base 20. The base 20 may for example be made of a plastic material such as epoxy resin. The strain gauges 21–24 and 31–34 are attached to the base 20 by bonding to the respective surfaces of the base 20 with an adhesive or embedded in the surface region of the base 20. Each of the strain gauges 21–24 and 31–34 is presently mounted at an angle of 45° with respect to y-axis. The stress detection sensor 3 is inserted into the hole 2 and installed on the axle centerline (the center axis 5 of the axle). The x, y and z axes are established in coincidence with the direction of advance of the vehicle 9, the direction of the axle 10 and the vertical direction 11, respectively. The top surface of the stress detection sensor (one side whose normal direction is z direction) is preferably above the centerline of the axle, the bottom surface of the sensor (another side whose normal direction is z direction) is preferably below the centerline of the axle, and the magnitude of the tensile or compressive strain due to the bending deformation generated by the road surface frictional force, vertical drag and side force acting on the wheel is the same on the two surfaces or the magnitude of the shear strain associated with the torsional deformation generated by the brake torque on actuation of the brake is the same on both surfaces. This is of increased significance when the distance between the top and bottom surfaces is large. It is similarly preferable that the front surface (one side whose normal direction is x direction) and the rear surface (another side whose normal direction is x direction) of the stress detection sensor be disposed on either side of the axle centerline and the strain due to the bending deflection or torsional deformation be the same on both sides. The hole 2 is then filled up with a filler 4 (an example of spacer means). The filler 4 is preferably of the same material as the stress detection sensor 3. The filler 4 fills up the gap around the stress detection sensor 3 to securely lock the sensor 3 in the hole 2. By the above procedure, the strain gauges 21–24 and 31–34 are embedded securely in the predetermined positions and orientations within the hole 2.

As in the signal processing circuit shown in FIG. 3, the set of strain gauges 21, 22, 23 and 24 and the set of strain gauges 31, 32, 33 and 34, of the strain detection sensor 3, are connected into respective bridges and these bridges are electrically connected to an amplification circuit 41 consisting of a direct current source 42 and an amplifier 43 and an amplification circuit 44 consisting of a direct current source 45 and an amplifier 46, respectively, through an electric signal line 8. In response to the road surface frictional force acting on the wheel, a shear strain is generated in the planes of the top and bottom surfaces of the stress detection sensors. The strain gauges 21–24 detect this shear strain. The amplification circuit 41 outputs a voltage signal proportional to this shear strain, that is to say the road surface frictional force. Partly because the strain gauges 21–24 form a bridge and partly because the shear strain is detected in the neighborhood of the axle centerline, cross-talk of the output signal due to the bending deformation and torsional deformation can be held to a minimum. In this manner, a device for measuring action force of a wheel capable of measuring the road surface frictional force with high precision can be implemented. Similarly, a shear stress is generated in the planes of the front and rear sides of the stress detection sensor in response to the vertical drag acting on the wheel. The strain gauges 31–34 detect this shear strain. The amplification circuit 44 outputs a voltage signal proportional to this shear stress, that is to say the vertical drag. Partly because the strain gauges 31–34 form a bridge and partly because the shear strain is detected in the neighborhood of the axle centerline, output signal cross-talk due to the bending deformation and torsional deformation can be minimized. In this manner, a device for measuring action force of a wheel capable of measuring the vertical drag with high precision is implemented. The road surface friction coefficient can be determined by applying output signals from the amplification circuits 41 and 44 to an operational circuit 47. In this connection, the operational circuit 47 divides the road surface frictional force value by the vertical drag value to give a road surface friction coefficient.

In this embodiment, since the gap around the stress detection sensor 3 in the hole 2 is filled up with a synthetic resin, e.g. epoxy resin, or other spacer means, the additional advantage is realized that the strain gauges 21–24 and 31–34 are protected against the external environment.

Figure 4:
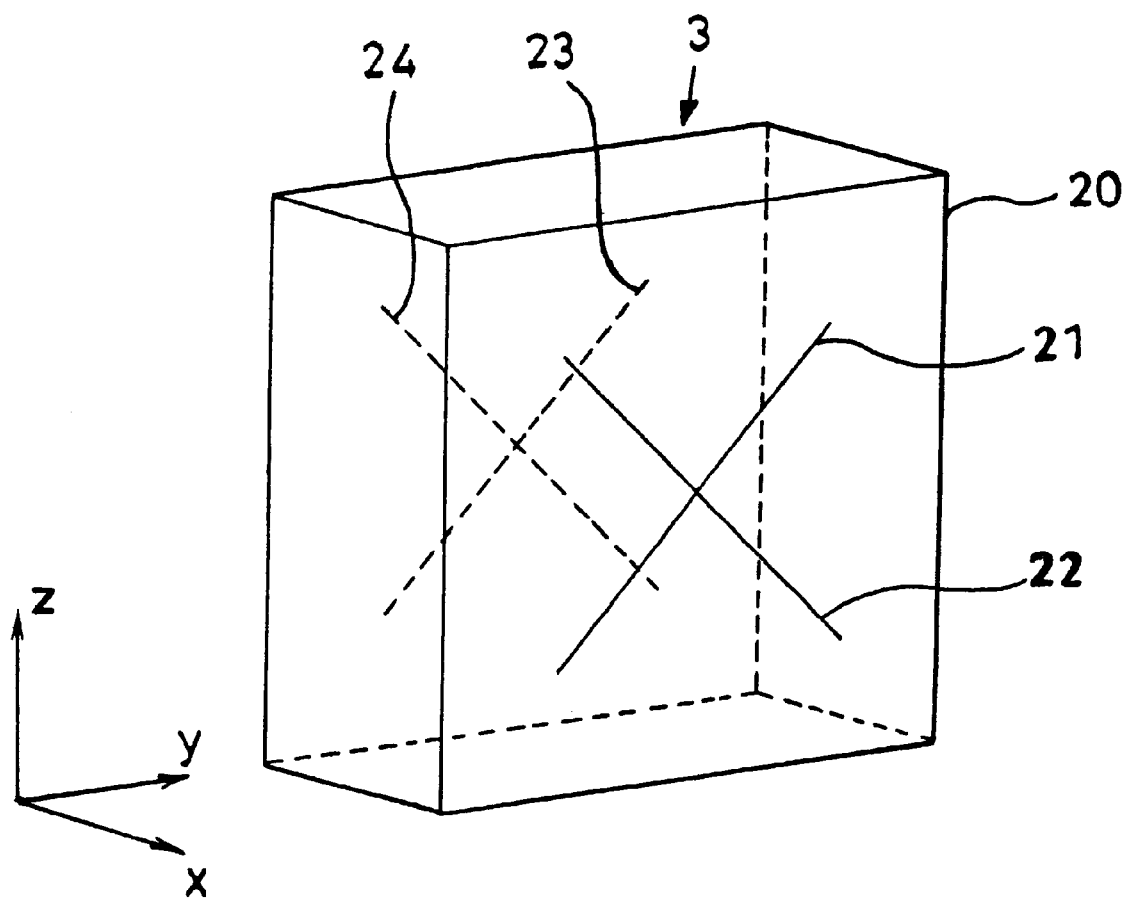
FIG. 4 is a partial perspective view showing another example of the stress detection sensor of the device for measuring action force of a wheel according to the invention.

In order to measure either the road surface frictional force or the vertical drag, the stress detection sensor 3 illustrated in FIG. 4 can be employed in lieu of the stress detection sensor 3 of FIG. 2. Thus, each of the strain gauges 21–24 is preferably installed at an angle of 45° with respect to y-axis. For the purpose of measuring the road surface frictional force, the x, y and z axes in FIG. 4 are preferably coincident with the vertical direction 11, direction of wheel advance 9 and axle direction 10, respectively. For the purpose of measuring the vertical drag, the x, y and z axes in FIG. 4 are preferably coincident with the direction of wheel advance 9, vertical direction 11 and axle direction 10. The relationship of the sensor installation position to the axle centerline is the same as for the stress detection sensor shown in FIG. 2. The strain gauges 21–24 are connected to a signal processing circuit shown in FIG. 5. Thus, they are formed into a bridge which, in turn, is connected to an amplification circuit 41. This amplification circuit 41 outputs a signal corresponding to the road surface frictional force or vertical drag.

Figure 5:
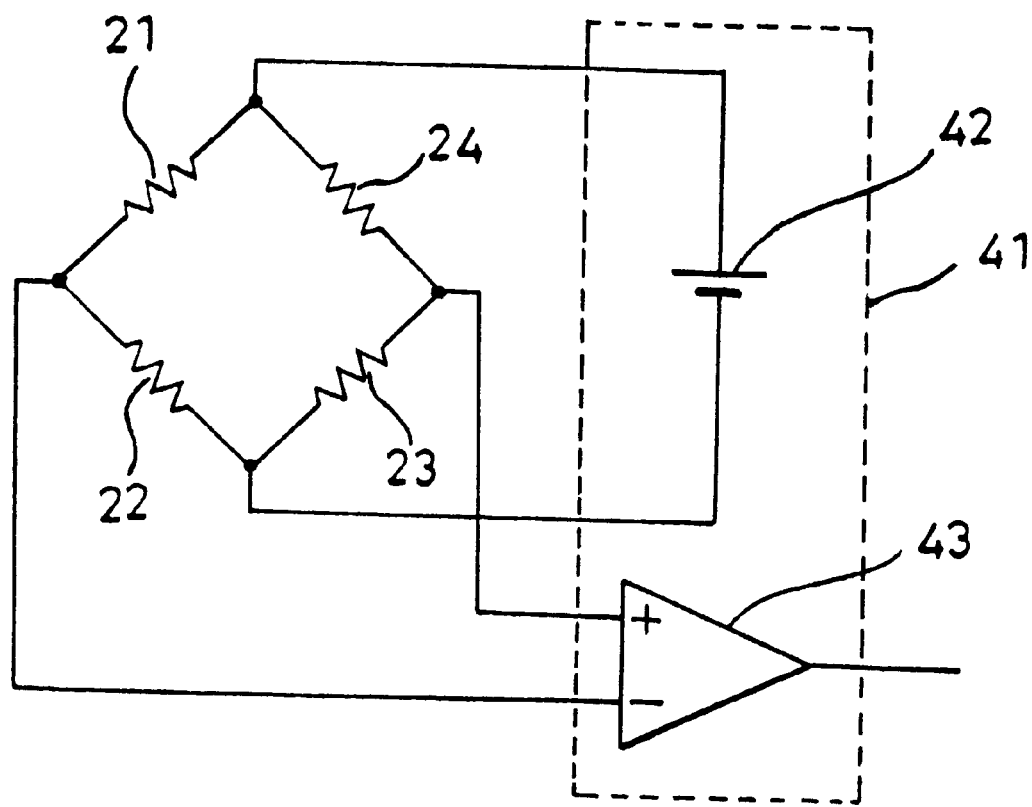
FIG. 5 is a diagrammatic view showing another example of the signal processing circuit of the device for measuring action force of a wheel according to the invention.
Figure 6:
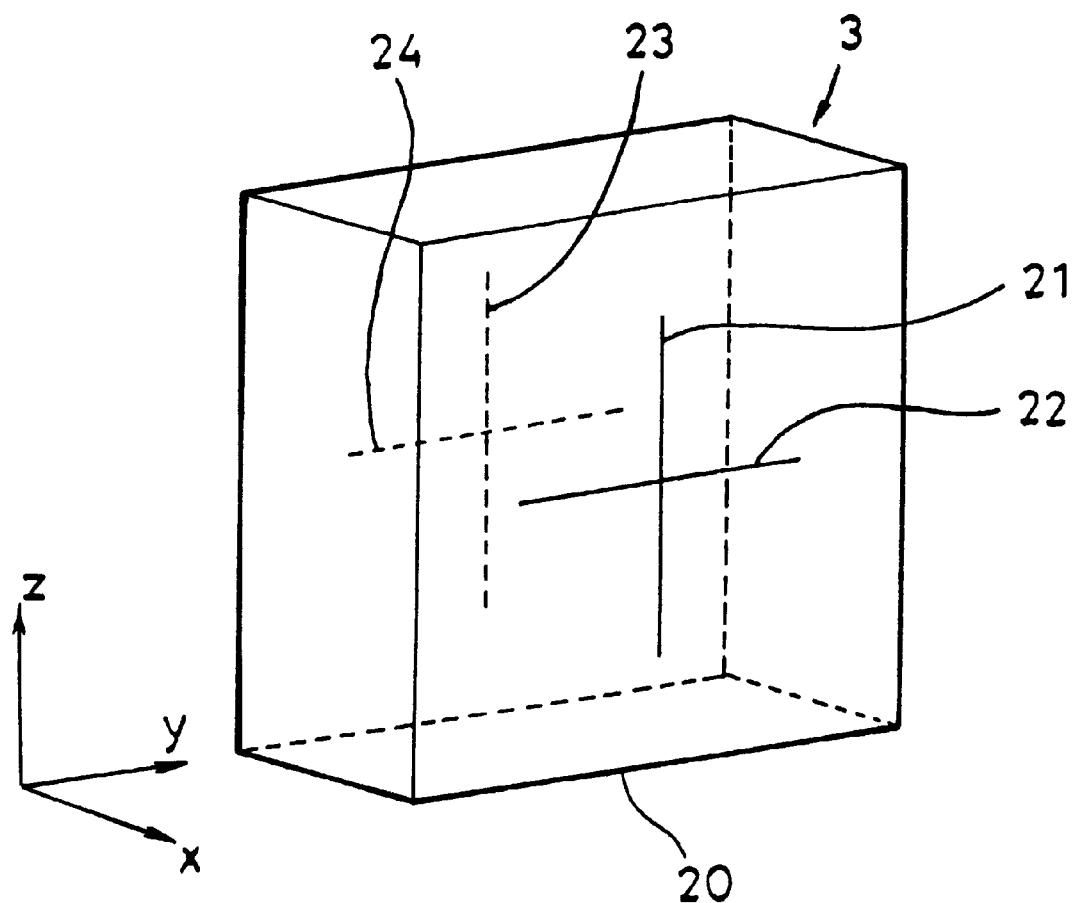
FIG. 6 is a partial perspective view showing still another example of the stress detection sensor of the device for measuring action force of a wheel according to the invention.

For the purpose of measuring the side force as a wheel action force, a stress detection sensor illustrated in FIG. 6 is employed and the respective strain gauges 21–24 are oriented along y-axis or z-axis as illustrated. Here, the axes x, y and z coincide with the direction of wheel advance 9, axle direction 10 and vertical direction 11, respectively, and the signal processing circuit is connected in the same manner as shown in FIG. 5. In this manner, a device for measuring action force of a wheel for measuring the side force acting on the wheel can be implemented.

Figure 7:
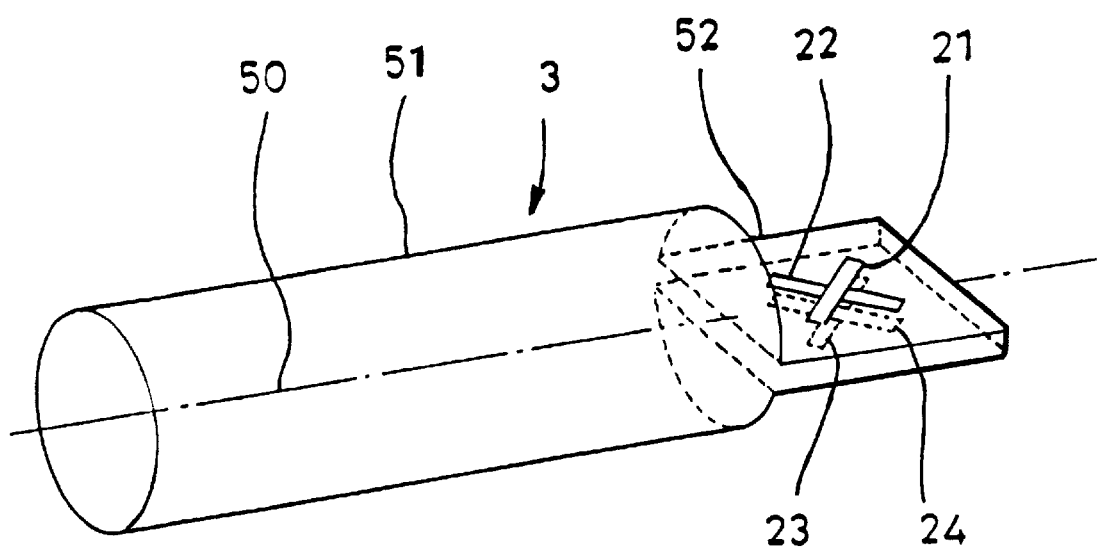
FIG. 7 is a partial perspective view showing a stress detection sensor constituting still another example of the device for measuring action force of a wheel.
Figure 8:
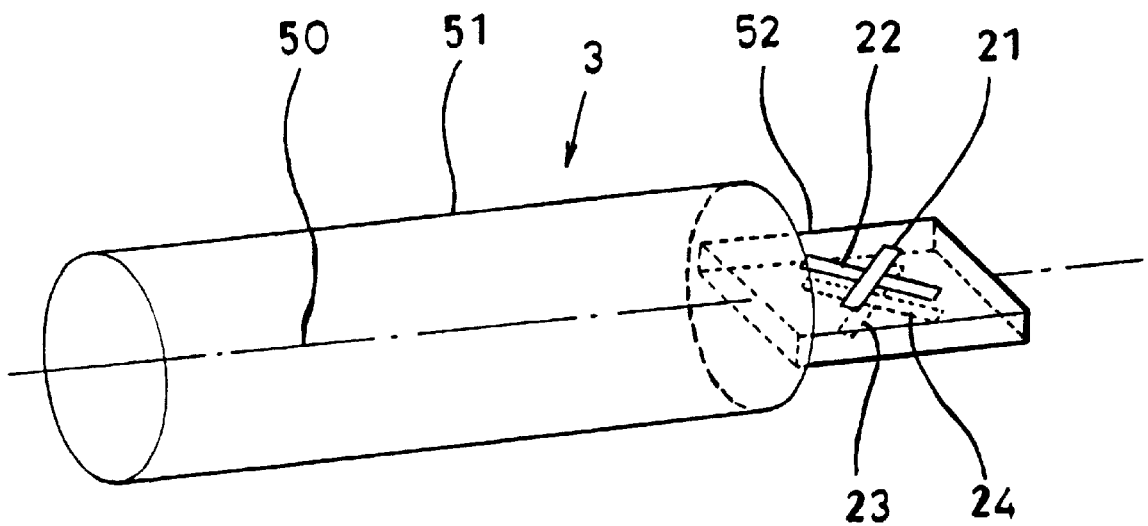
FIG. 8 is a partial perspective view showing another example of the stress detection sensor constituting still another example of the device for measuring action force of a wheel.

Further examples of the stress detection sensor are shown in FIGS. 7 and 8. In these examples, the stress detection sensor comprises strain measuring gauges 21–24 attached to a planar part 52 at one end of a bar-shaped structure 51. Here, too, resistance strain gauges are used as the strain measuring gauges. The bar-shaped structure 51 may be made of a plastic material or of the same material as the axle 1 in which the sensor is embedded. The strain gauges 21, 22, 23 and 24 are installed with their respective axes making an angle of 45° with respect to a center axis 50 and fixedly mounted in the hole 2 formed in the axle 1. Thus, it can be mounted by tapping, adhesion, brazing, welding, shrinkage fitting or the like. Because of the bar-shaped structure, there is the advantage that the strain gauges can be easily set in predetermined positions and orientations in installing and locking the stress detection sensor 3 in the hole 2.

Particularly, in the case shown in FIG. 8, the width of the planar part 52 is smaller than the diameter of the bar-shaped structure 51. For this reason, in installing and locking the stress detection sensor 3 in the hole 2, the occurrence of twisting or other deformation and consequent excessive straining or damage of the planar part 52 due to rotation or the like can be effectively prevented.

Figure 9:
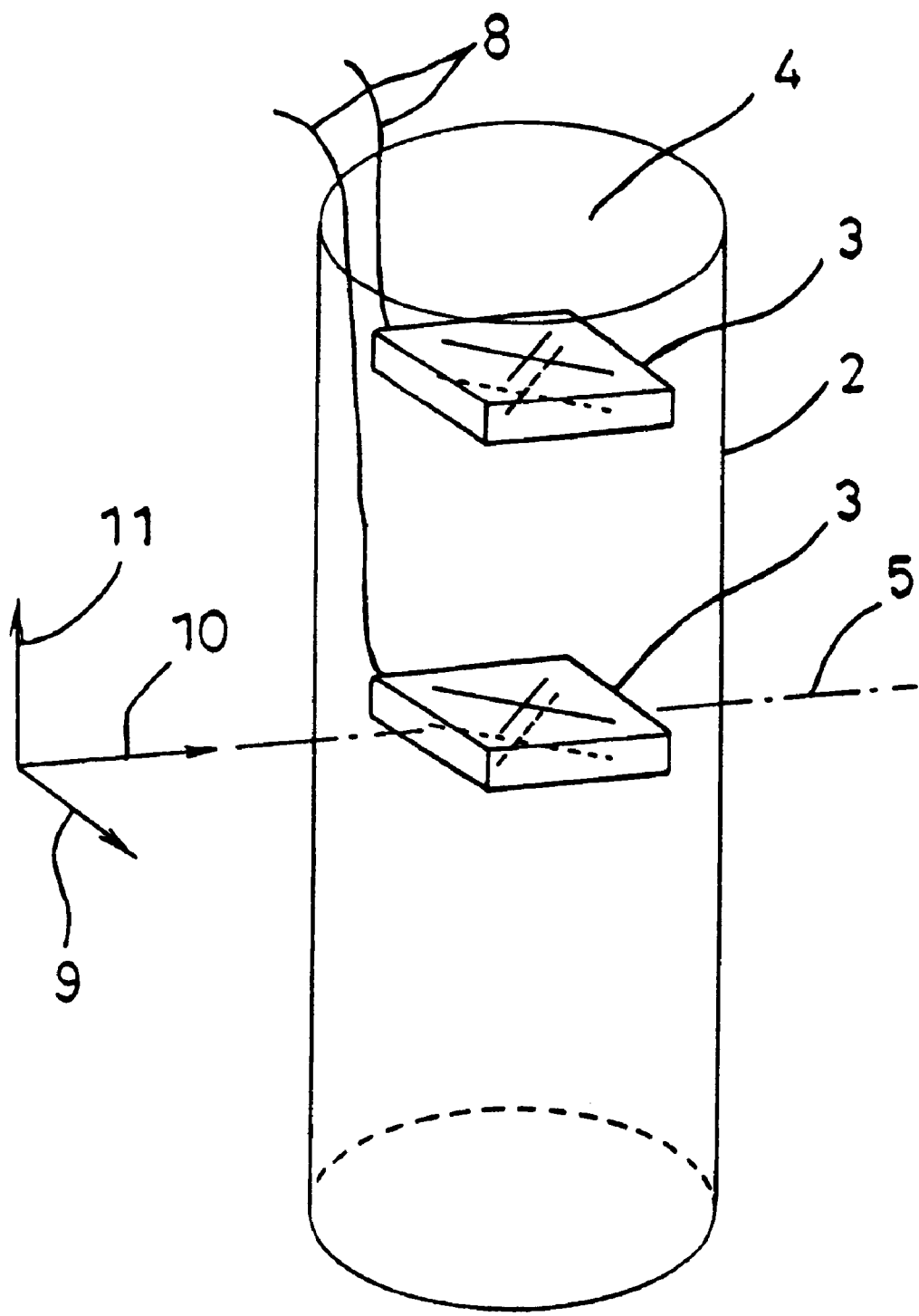
FIG. 9 is a perspective interior view showing a mode of embodiment wherein a plurality of stress detection sensors are employed in a device for measuring the road surface frictional force and the brake torque or drive torque as wheel action forces.

FIG. 9 is a diagrammatic view showing the hole 2 formed in the axle on an exaggerated scale. In this example, two units of the stress detection sensor 3 shown in FIG. 4 are employed. The x, y and z axes are established in coincidence with the vertical direction 11, direction of wheel advance 9 and axle direction 10, respectively. The sets of strain gauges of 21–24 and 31–34 of each stress detection sensor 3 are connected in the same manner as in the signal processing circuit shown in FIG. 3, whereby the road surface frictional force and either the drive torque or the brake torque on actuation of the brake system can be outputted. Using the output signals from two amplification circuits 41 and 44, an operational circuit 47 can give the road surface frictional force by addition and the torque by subtraction. In this example, one of the stress detection sensors 3 is set on the center axis 5 of the axle but the same result is obtained when both sensors are offset from the center axis 5.

Figure 10:
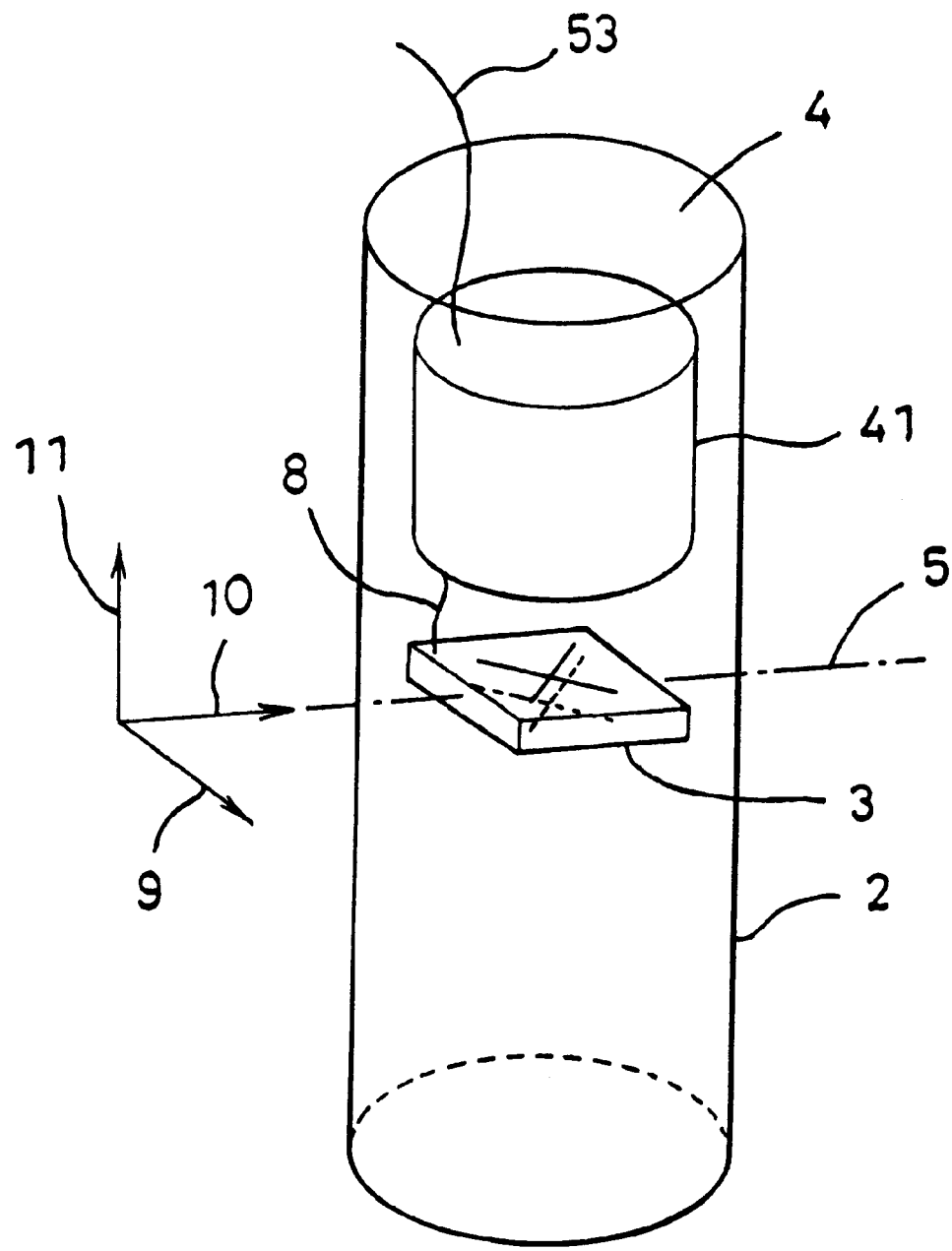
FIG. 10 is a perspective interior view showing a mode of embodiment wherein a signal processing circuit and a stress detection sensor are securely mounted in the same hole in a device for measuring the road surface frictional force as a wheel action force.

FIG. 10 is an example of measuring the road surface frictional force, where the amplification circuit 41 and stress detection sensor 3 are securely mounted together in the same hole 2. Installation of the amplification circuit 41 in the hole 2 can be effected by the circuit integration technology available today. By disposing the amplifier 41 in close proximity with the stress detection sensor 3, a noise-lean output signal can be made available on the signal line 53.

Figure 11:
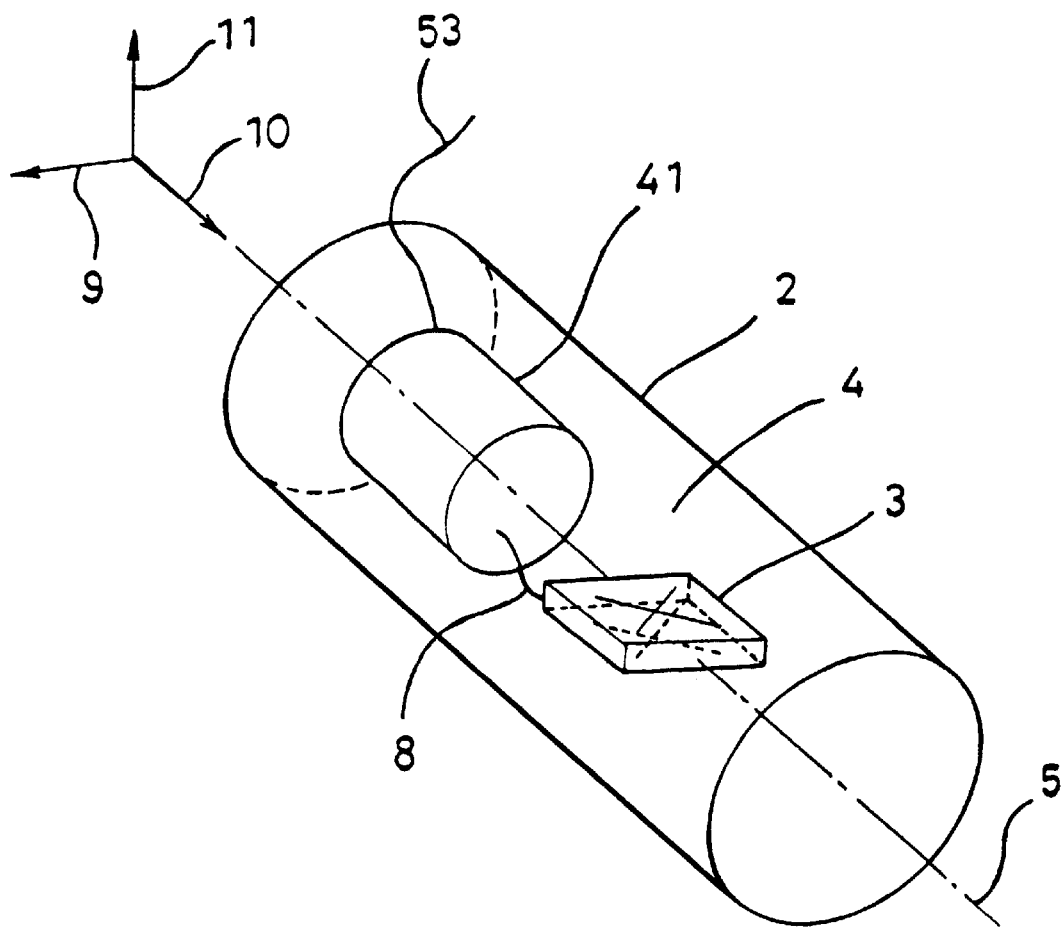
FIG. 11 is a perspective interior view showing a mode of embodiment wherein a signal processing circuit and a stress detection sensor are securely mounted in the same horizontal hole in a device for measuring the road surface frictional force as a wheel action force.

FIG. 11 shows an example of measuring the road surface frictional force with a system where the axle is formed with a horizontal hole and the amplification circuit 41 and stress detection sensor 3 are set together with the hole, just as in the example shown in FIG. 10.

Figure 12:
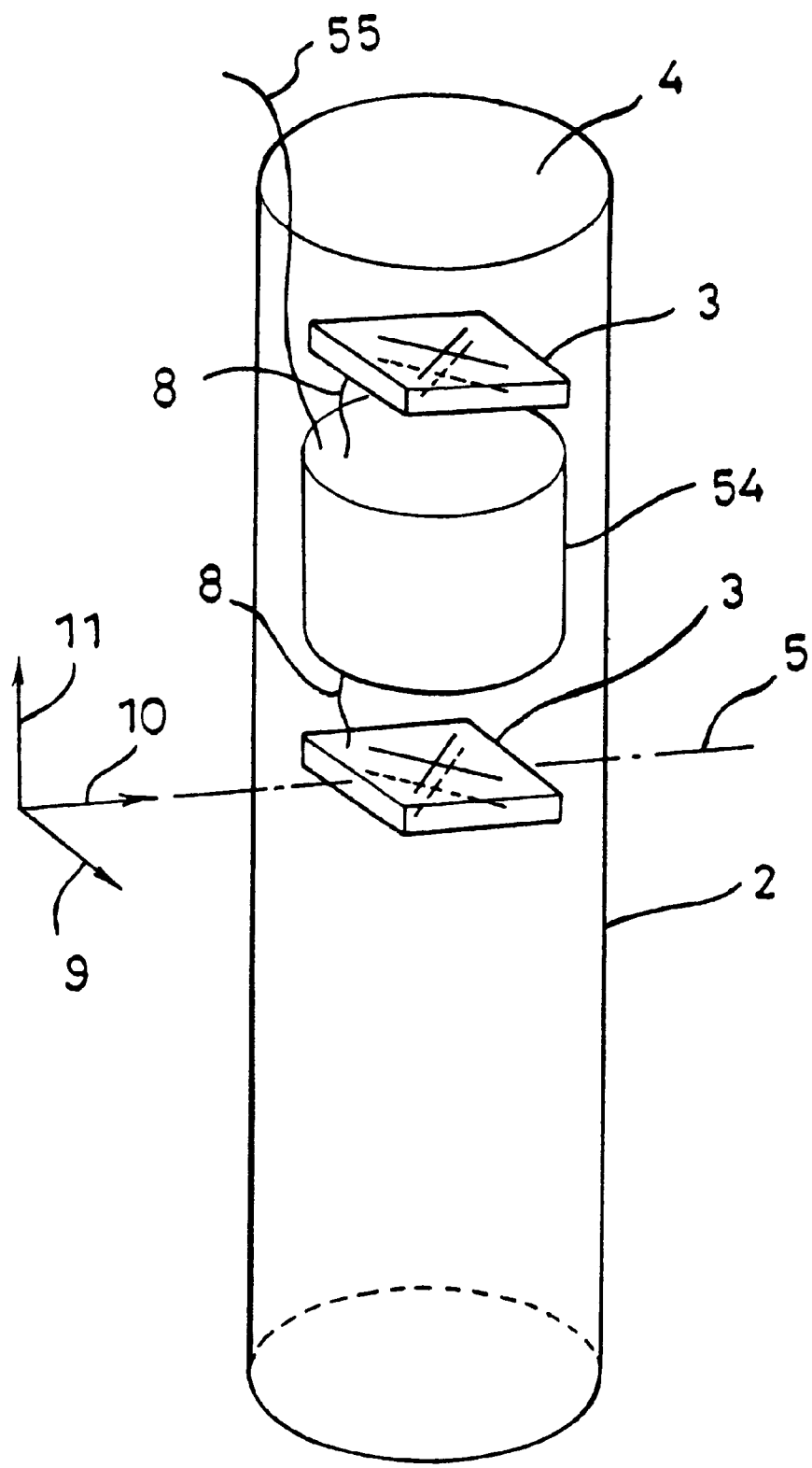
FIG. 12 is a perspective interior view showing a mode of embodiment wherein a plurality of stress detection sensors are used and a signal processing circuit and a stress detection sensor are securely mounted in the same hole in a device for measuring the road surface frictional force and the brake torque or drive torque as wheel action forces.

FIG. 12 shows an example of the device for measuring the road surface frictional force and either the drive torque or the brake torque, all of which act on the wheel, by means of two stress detection sensors 3, where a signal processing circuit 54 comprising amplification circuits 41 and 44 and an operational circuit 47 are installed together with the stress detection sensor 3 in the hole. The numeral 55 represents an output signal line of the signal processing circuit 54.

Figure 13:
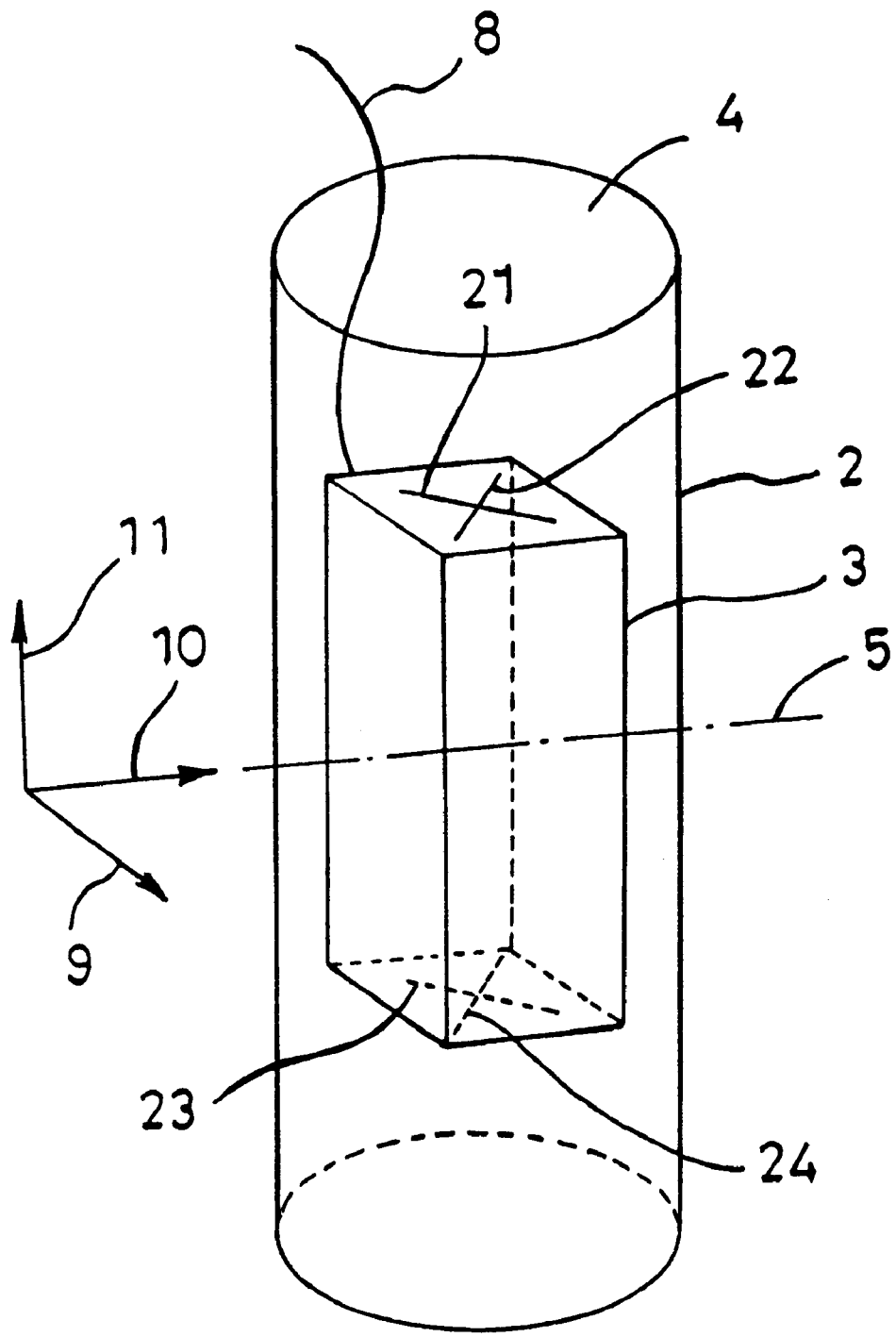
FIG. 13 is a perspective interior view showing an example of the stress detection sensor of a device for measuring the brake torque or the drive torque as a wheel action force.

FIG. 13 shows an example of measuring the brake torque or drive torque with a single stress detection sensor 3. The strain gauges 21, 22, 23 and 24 are connected in the same manner as shown in FIG. 5 except that 22 and 23 are exchanged, viz. in the order of 21, 23, 22 and 24, whereby a device for measuring the above-mentioned torque is implemented.

Figure 14:
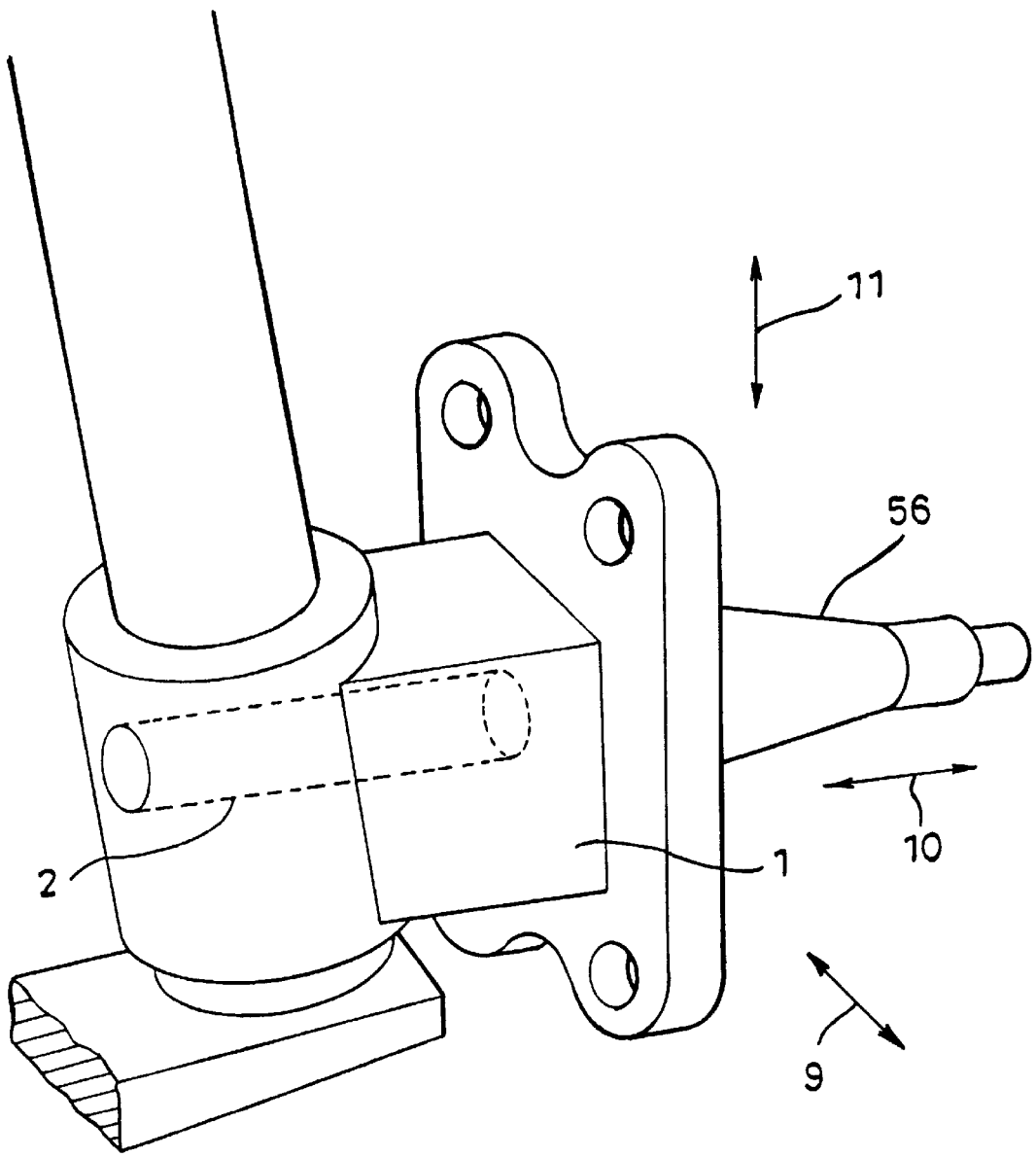
FIG. 14 is a partial perspective view showing another example of the hole for supporting the stress detection sensor of the device for measuring action force of a wheel according to the invention.

Shown in FIG. 1 is an example in which the hole 2 for accepting the stress detection sensor 3 is formed in the vertical direction 11. However, the orientation of the hole 2 is optional, of course. For example, the hole 2 can be formed in the horizontal direction, e.g. along the direction of advance 9 of the wheel. FIG. 14 shows an example in which the hole is provided in the axle direction 10. Moreover, the position of the hole is not limited to the position of the knuckle but may be a distal position of the axle, that is to say at the so-called spindle 56. The example illustrated in FIG. 14 is advantageous in that simply by installing the same type of stress detection sensor as that shown in FIG. 7 or 8 in an altered orientation, it can serve not only as a device for measuring the road surface frictional force but also as a device for measuring the vertical drag.

Figure 22:
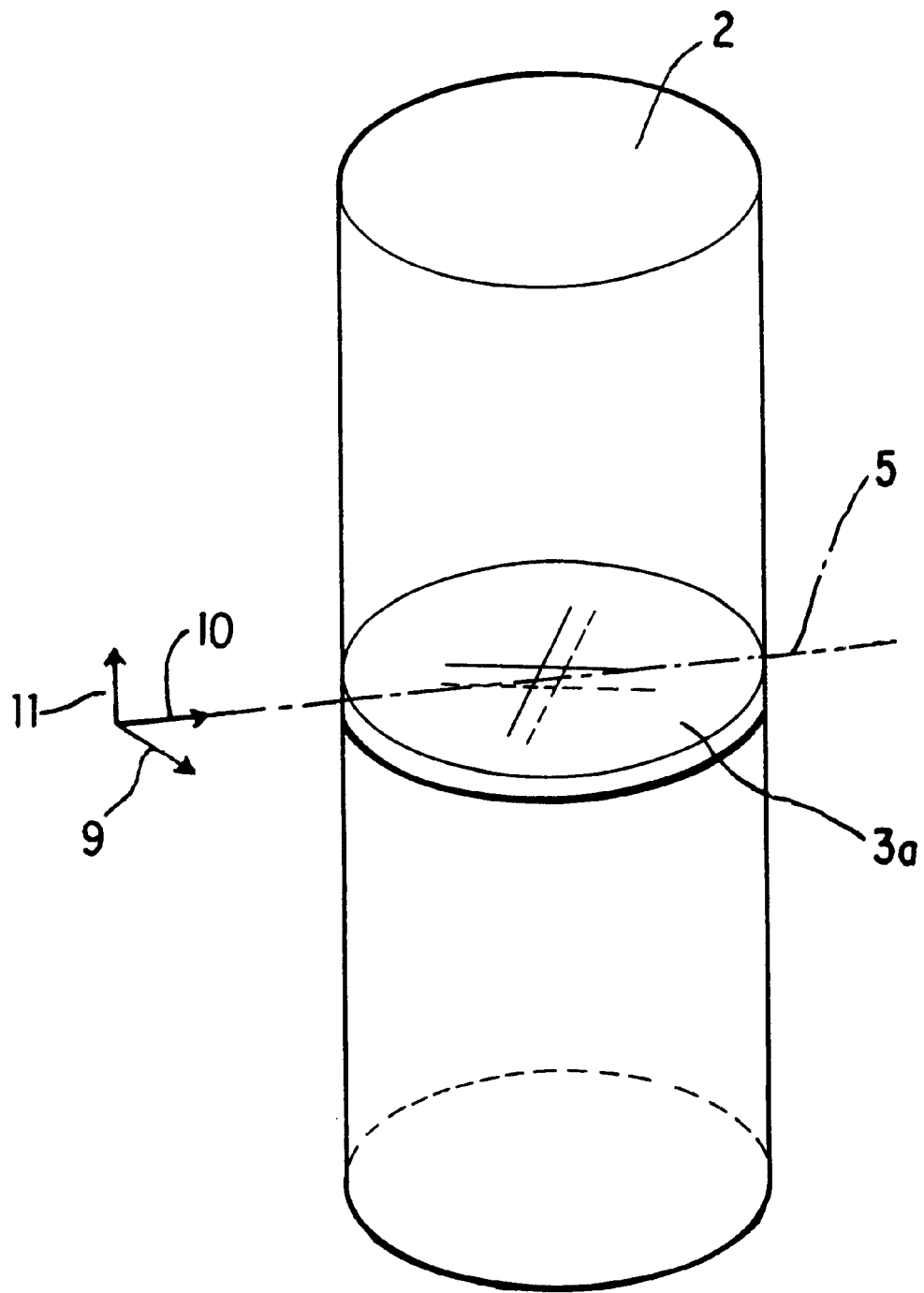
FIG. 22 is a perspective interior view showing another installation of a stress detection sensor of the invention.
Figure 23:
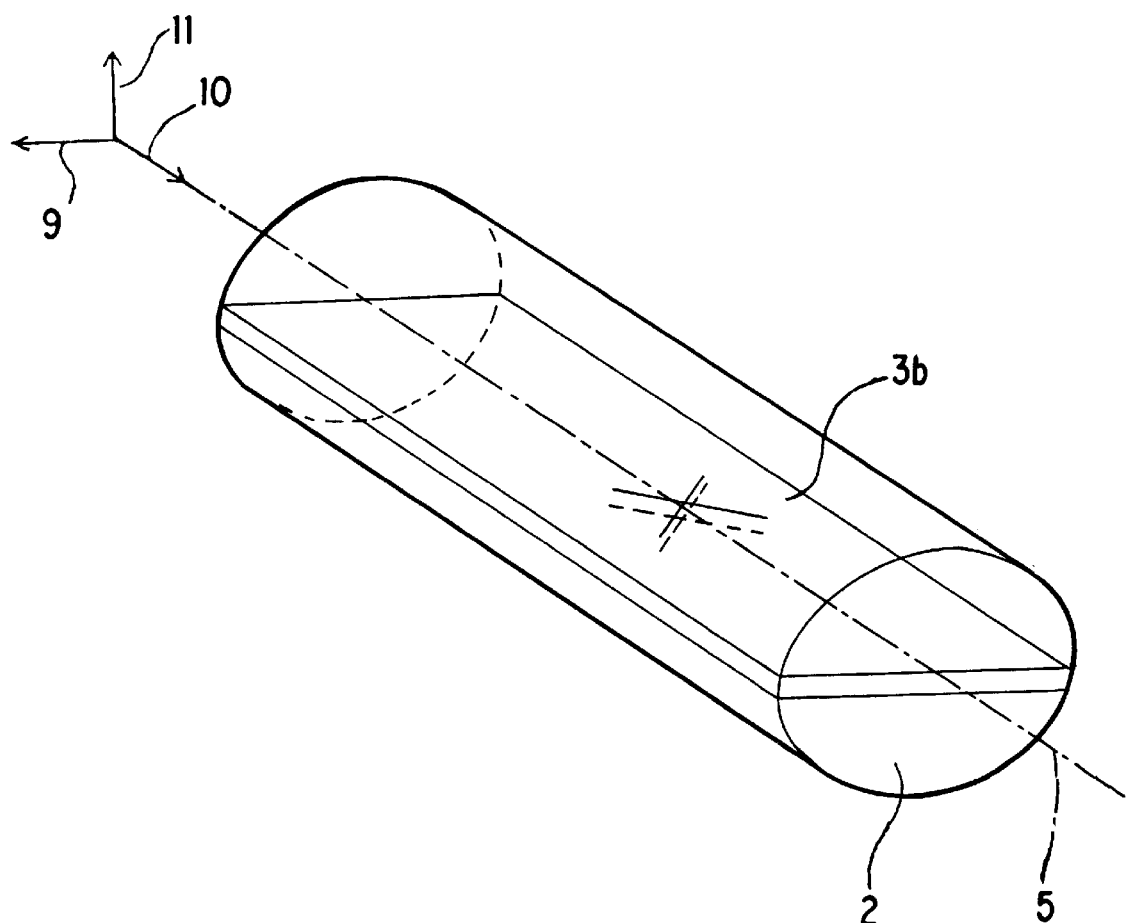
FIG. 23 is a perspective interior view of yet another installation of a stress detection sensor according to the invention.

As described above, a stress detection sensor 3 is secured in a hole 2 through a spacer means 4 in examples shown in FIGS. 1 and 9 to 13. As shown in FIG. 22, however, a stress detection sensor 3a comprising a disc-like base plate made of a plastic or metal with a diameter substantially equal to that of the hole 2 and strain gauges attached to the both surfaces of the base plate may be inserted into the hole 2 wherein the lateral sides, i.e., circumference, of the base plate directly contacts and is secured to the inner surface of the hole 2 through adhesive, thus necessitating no spacer means. A base plate may be rectangular with its width substantially the same as that of the diameter of the hole 2 as shown in FIG. 23 wherein two of the lateral sides of the rectangular base plate of a stress detection sensor 3b are secured to the inner surface of the hole 2 in the same manner. Furthermore, the base plate of a sensor 3 shown in, for example, FIG. 9 can be larger so that lateral sides thereof contact the inner surface of the hole 2. The same principle is applicable to all the other embodiments to whatever extent possible. Although it is not necessary, a spacer means 4 may be provided in hole 2 where a sensor is secured through the direct contact of lateral sides thereof with the inner surface of the hole. Adhesive is not required if a base plate can be secured to the inner surface of a hole by other specific means, friction, or the like.

Figure 15:
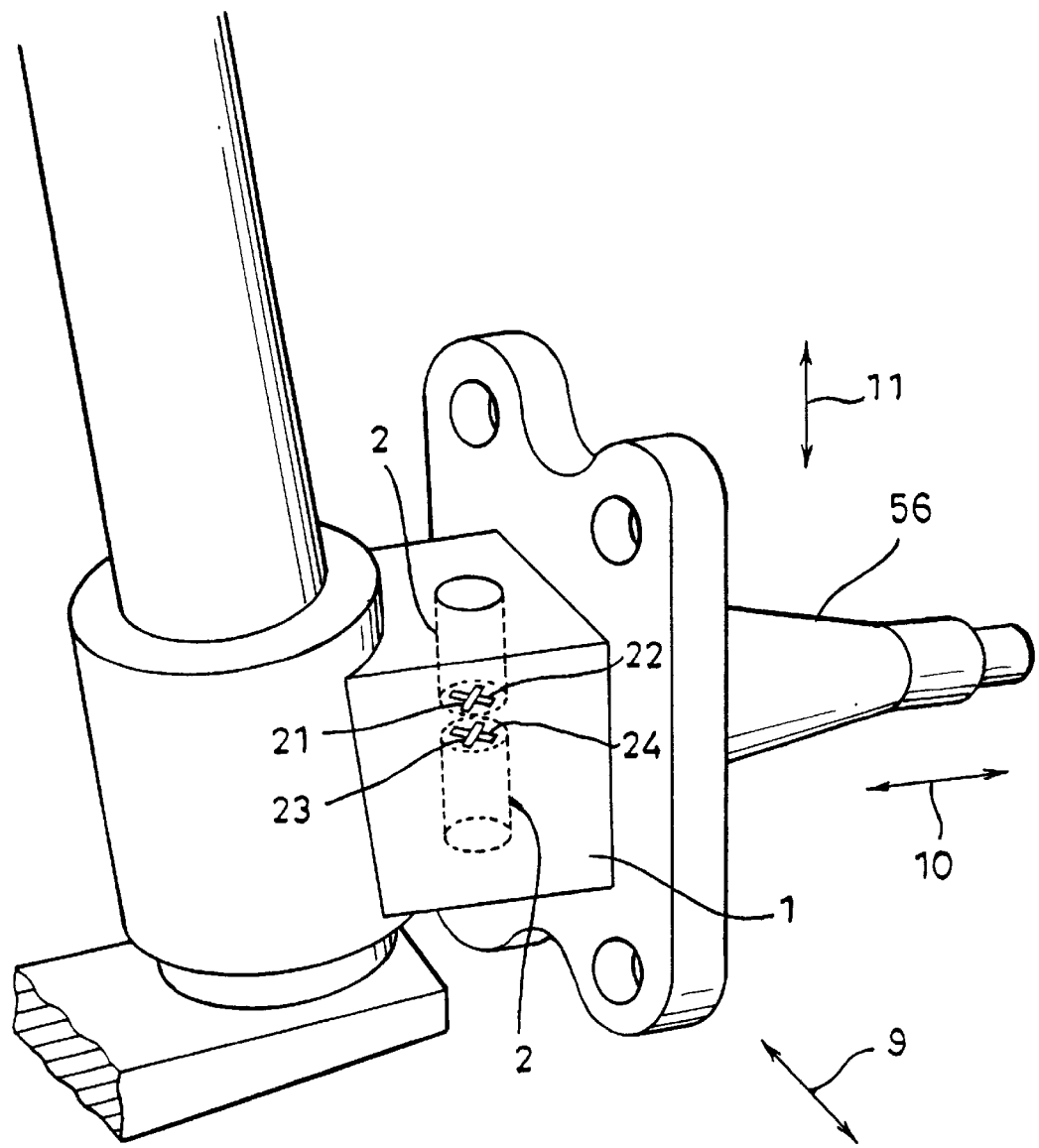
FIG. 15 is a partial perspective interior view showing the installation state of a stress detection sensor constituting another example of the device for measuring the road surface frictional force as a wheel action force.

FIG. 15 shows still another embodiment of the device for measuring action force of a wheel. Regarding this embodiment, too, there is shown an example in which resistance strain gauges as the stress detection sensors are mounted on the axle of a driven wheel of a vehicle having the strut type suspension structure which is often employed in automobiles. In this example, the wheel action force measured is the road surface frictional force.

The holes 2 are preferably extending from the top and bottom of the axle in the direction 11 perpendicular to the road surface and intersecting the centerline of the axle. The diameter of each hole 2 may for example be about 5 mm to about 20 mm. The bottom surface of each hole 2 preferably lies close to the axle centerline. For example, the distance between the respective bottom surfaces in the neighborhood of the axle centerline may be about 1 mm. It is preferable that the hole 2 formed from the top side be disposed above the axle centerline and the hole 2 formed from the bottom side by disposed below the axle centerline and that the magnitude of the tensile or compressive stress associated with the bending deformation due to the road surface frictional force and vertical drag acting on the wheel be the same on both bottom surfaces or the magnitude of the shear strain associated with the torsional deformation due to the brake torque on actuation of the brake be the same on both bottom surfaces. This is of increased significance when the distance between the two bottom surfaces is large. Resistance strain gauges are attached to each of the bottom surfaces in the following manner. Four resistance strain gauges are provided and affixed to the bottom surfaces, two per bottom. They are so attached that each strain gauge makes an angle of 45° with respect the direction of spindle center axis 10. These strain gauges 21–24 are formed into a bridge circuit in the same manner as in the signal processing circuit shown in FIG. 5 and the bridge is connected to an amplification circuit 41. In response to the road surface frictional force acting on the wheel, a shear strain is generated in the plane of the bottom surface of each hole. The strain gauges detect this shear strain. The amplification circuit 41 outputs a voltage signal proportional to this shear strain, that is to say the road surface frictional force. Partly because the axle is bored to make holes 2 and the shear strain is detected in the vicinity of the axle centerline and partly because the strain gauges constitute a bridge, the output signal crosstalk due to the bending deformation or torsional deformation can be minimized. Thus, a device for measuring the road surface frictional force with high precision is implemented. Furthermore, by filling the holes 2 with a synthetic resin, e.g. epoxy resin, or other spacer means, the strain gauges 21–24 can be protected against the external environment.

Figure 16:
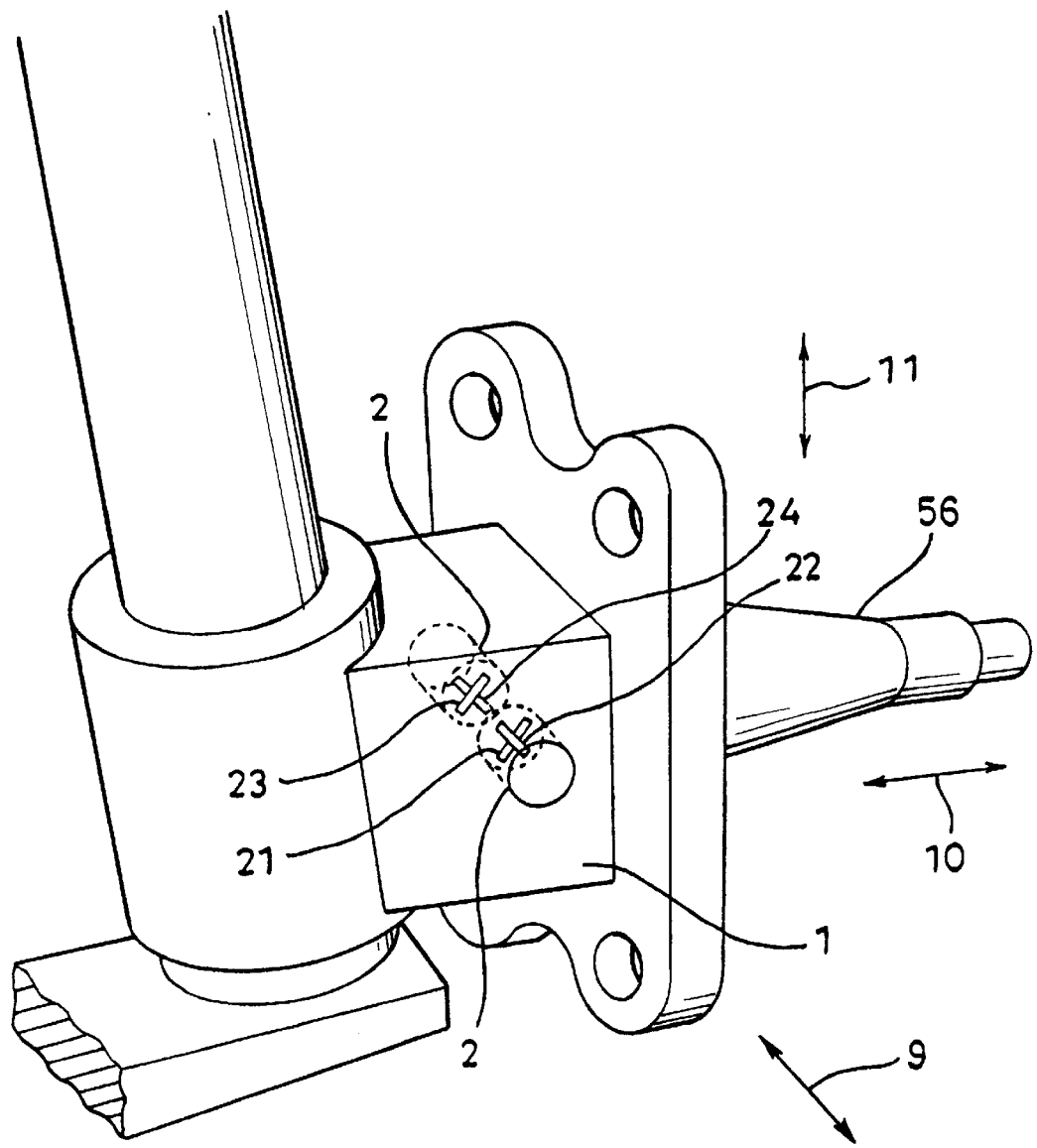
FIG. 16 is a partial perspective interior view showing the installation state of a stress detection sensor constituting still another example of the device for measuring the vertical drag as a wheel action force.

FIG. 16 shows still another embodiment of the device for measuring action force of a wheel. In this embodiment, the vertical drag as a wheel action force is measured. Regarding this embodiment, too, here is shown an example in which resistance strain gauges as strain measuring gauges are attached to the axle of a driven wheel of a vehicle having the strut type suspension structure. As illustrated, the holes are preferably formed in such a manner that they extend from both sides of the axle 1 in mutual alignment in the direction of advance 9 of the wheel and intersect the centerline of the axle. The diameter of each hole may for example be about 5 mm to about 10 mm just as in the case of the device for measuring the road surface frictional force. The bottom surface of each hole preferably lies close to the axle centerline. For example, the distance between the respective bottom surfaces in the neighborhood of the axle centerline may be about 1 mm. It is preferable that the hole extending from the front side be disposed forwardly of the axle centerline while the hole extending from the rear side by disposed rearwardly of the axle centerline and that the magnitude of the tensile or compressive strain due to the bending deformation caused by the road surface frictional force and vertical drag acting on the wheel be the same on the two bottom surfaces or the magnitude of the shear stress due to the torsional deformation caused by the brake torque on actuation of the brake be the same on the two bottom surfaces. This is of increased significance when the bottom-to-bottom distance is large. Resistance strain gauges are affixed to each of said bottom surfaces in the following manner. Thus, four resistance strain gauges are provided and affixed to the respective bottom surfaces, two per bottom. Each of the strain gauges is disposed to make an angle of 45° with respect to the direction 11 perpendicular to the road surface. These strain gauges 21–24 are connected to form a bridge circuit as in the signal processing circuit shown in FIG. 5 and the bridge circuit is connected to an amplification circuit 41. In response to the vertical drag which acts on the wheel from the road surface, a shear strain is generated in the plane of the bottom surface of each hole. The above strain gauges detect this shear strain. The amplification circuit 41 outputs a voltage signal proportional to this shear stress, that is to say the vertical drag. Because the holes 2 are formed in the axle and the shear strain is detected in the vicinity of the axle centerline, the output signal crosstalk due to the bending deformation or torsional deformation can be held to a minimum. Thus, a vertical drag detecting device with high precision is implemented. Moreover, by filling up the holes 2 with a synthetic resin, e.g. epoxy resin, or other spacer means, the strain gauges can be protected against the external environment.

By using the road surface frictional detecting device shown in FIG. 15 in combination with the vertical drag detecting device shown in FIG. 16, a device for measuring action force of a wheel for determining the road surface friction coefficient can be implemented. Where the center axis of the holes extending in the up-and-down direction in the road surface frictional force measuring device and the center axis of the holes extending in the front-and-rear direction in the vertical drag measuring device are close to each other or intersecting each other, the bottom surface of at least one of these two pairs of holes must be at a certain distance from the centerline of the axle. Provided that the above two centerlines are sufficiently apart, the bottom surface of any pair can be disposed in the vicinity of the axle centerline. Since this is a combination of the road surface frictional force measuring device and the vertical drag measuring device, this device for measuring the road surface friction coefficient has the characteristics of the two constituent devices. Thus, for the reason mentioned hereinbefore, a device for measuring the road surface friction coefficient with high precision and a minimum of crosstalk can be implemented.

Figure 17:
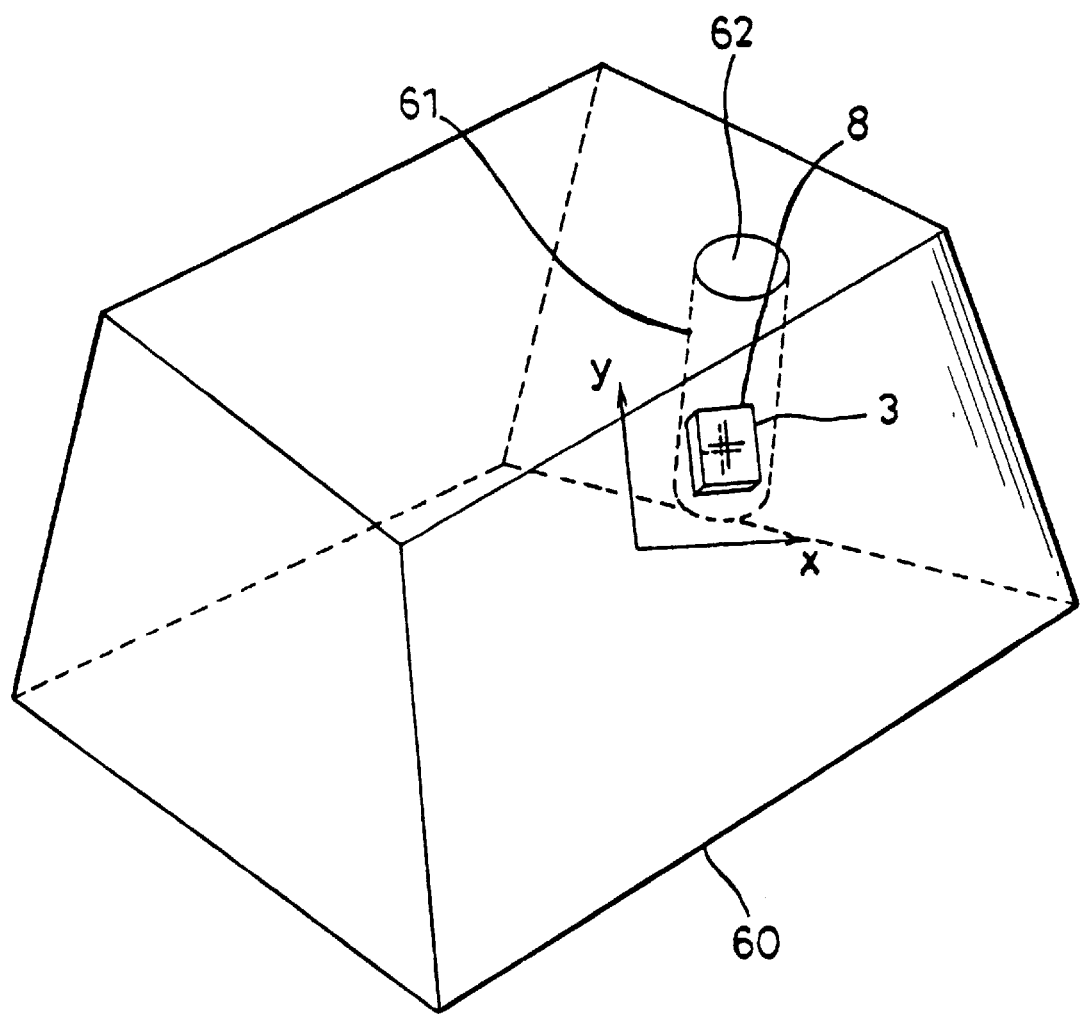
FIG. 17 is a perspective interior view showing another example of the device for measuring stress of a structure.

The principle of measuring the various forces acting on the wheel at the axle is to detect the strains produced in the axle by such forces using strain gauges. Therefore, by modifying the procedure of measuring forces acting on the wheel at the axle, stresses generated in any desired structure can be easily measured. An example of application is shown in FIG. 17. The same stress detection sensor as shown in FIG. 6 is inserted into a hole 61 formed in a structure 60 and the gap around it is filled up with a filler 62. This example is a measuring device applicable to the case in which a plane strain with a known direction of main strain is generated in the measurement part of the structure 60. As shown, x, y represent the directions of said main strain.

The technology of measuring a stress or load with an embedded stress detection sensor carrying strain gauges according to the present invention is advantageous in that by installing the stress detection sensor in a hole in the proper orientation according to the target strain or load, any stress or load can be successfully measured.

Figure 18:
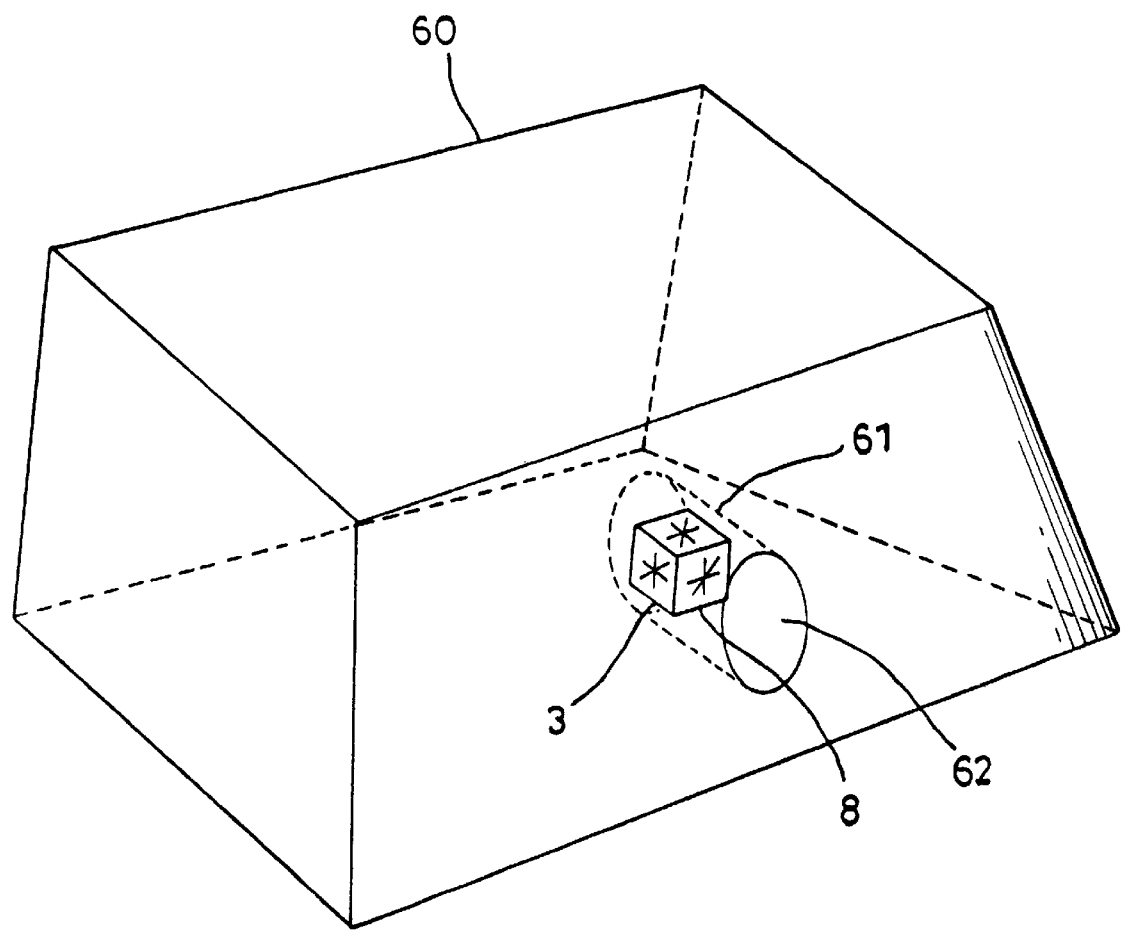
FIG. 18 is a perspective interior view showing still another example of the device for measuring stress of a structure.
Figure 19:
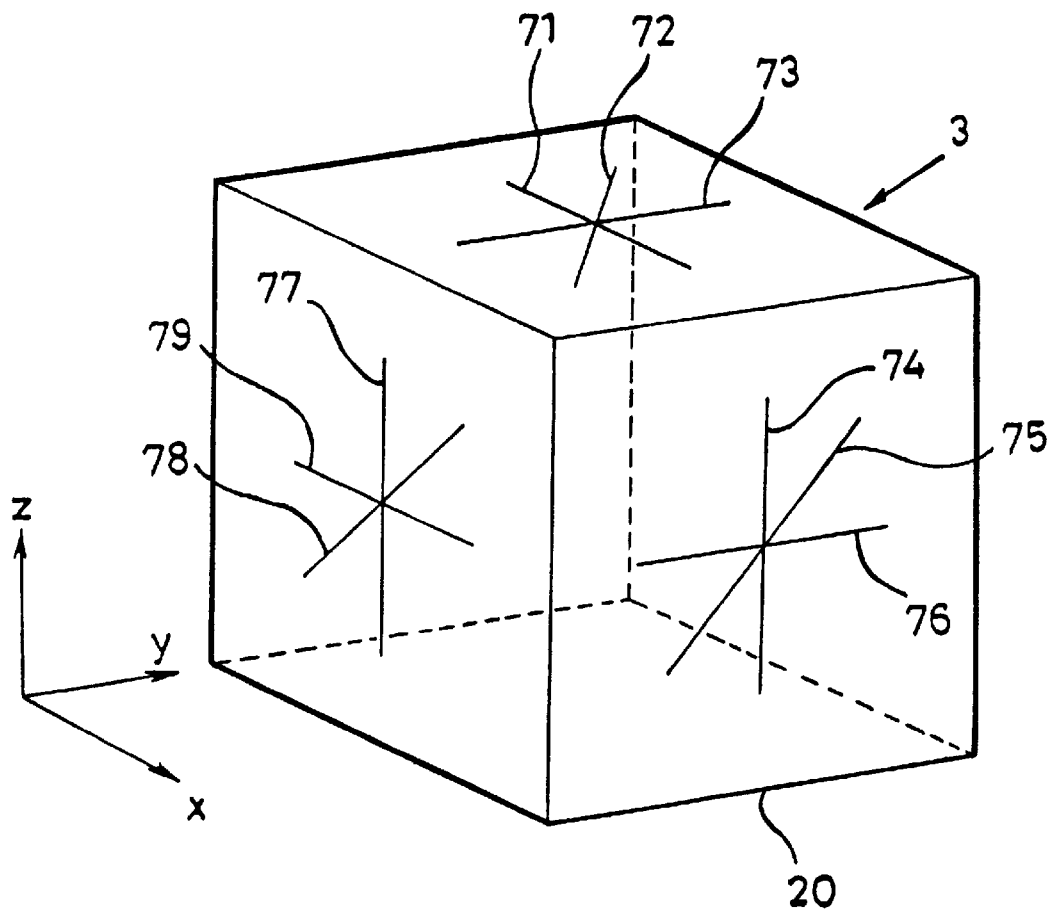
FIG. 19 is a perspective view showing another example of the stress detection sensor equipped with strain gauges.

FIG. 18 is a measuring device applicable to the case in which the direction of main strain at the measurement part of a structure is unknown. Here, the stress detection sensor 3 illustrated in FIG. 19 is employed. This is an example where strain gauges 71–79 constitute a triaxial rosette gauge and the distribution of stress in the 3 axial directions can be measured by the known technique using a rosette gauge.

In the device for measuring action force of a wheel illustrated in FIG. 1, the stress detection sensor 3 illustrated in FIG. 19 can be employed as the stress detection sensor 3. By utilizing the known technique employing a rosette gauge, stresses generated in the knuckle in correspondence with road surface frictional force, vertical drag and other wheel action forces can be measured. In other words, any desired wheel action force can be measured.

Figure 20:
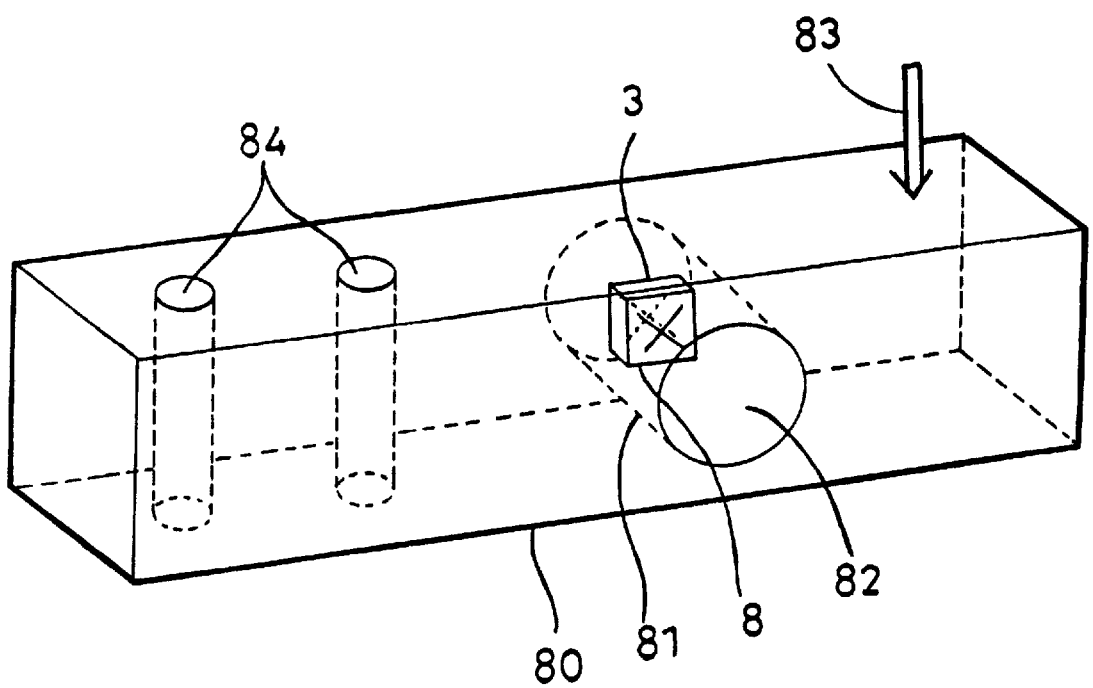
FIG. 20 is a perspective interior view showing an example of the load measuring device as an embodiment of the device for measuring stress of a structure.

As an example of application of the device for measuring stress of a structure, a load measuring device can be implemented. A typical example of application is shown in FIG. 20. As it is the case with the axle, a pillar-shaped element 80 of stainless steel or the like is formed with a hole 81 and a stress detection sensor 3 is inserted and secured by filling with a filler 82. In this example, the stress detection sensor 3 shown in FIG. 4 is employed. In this arrangement, a load 83 to be measured can be measured. In this case, the strain gauges detect the shear strain generated in the pillar by the load to be measured. Therefore, there is a certain degree of freedom in regard of the position subject to the load to be measured. The reference numeral 84 indicates holes for fixing the load measuring device in position. While this is an example, by applying the principle of this device for measuring stress of a structure, an expedient load measuring device can be implemented.

By drilling a hole 61 in a structure 60 other than the axle and installing the stress detection sensor shown in FIG. 7 or 8, the stress that may be generated in the structure 60 can be measured. In this case, this structure 60 is made of the same material as the bar-shaped structure 51 of the stress detection sensor. It is fixedly secured by the same procedure for mounting on the axle 1 as described hereinbefore. The signal processing circuit shown in FIG. 5 is used in conjunction with it. With the stress detection sensor shown in FIG. 7 or 8, the shear strain generated in the object structure in a direction perpendicular to the center axis 50 of the compressive or tensile strain in the direction of strain gauges is measured. With the stress detection sensor shown in FIG. 7 or 8, strains of various kinds generated in the object structure in various directions can be measured by varying the direction of attachment of strain measuring gauges. Another advantage is that, by drilling a hole 61 in any position of the structure 60, strains in that position can be measured using the same kind of stress detection sensor.

Figure 21:
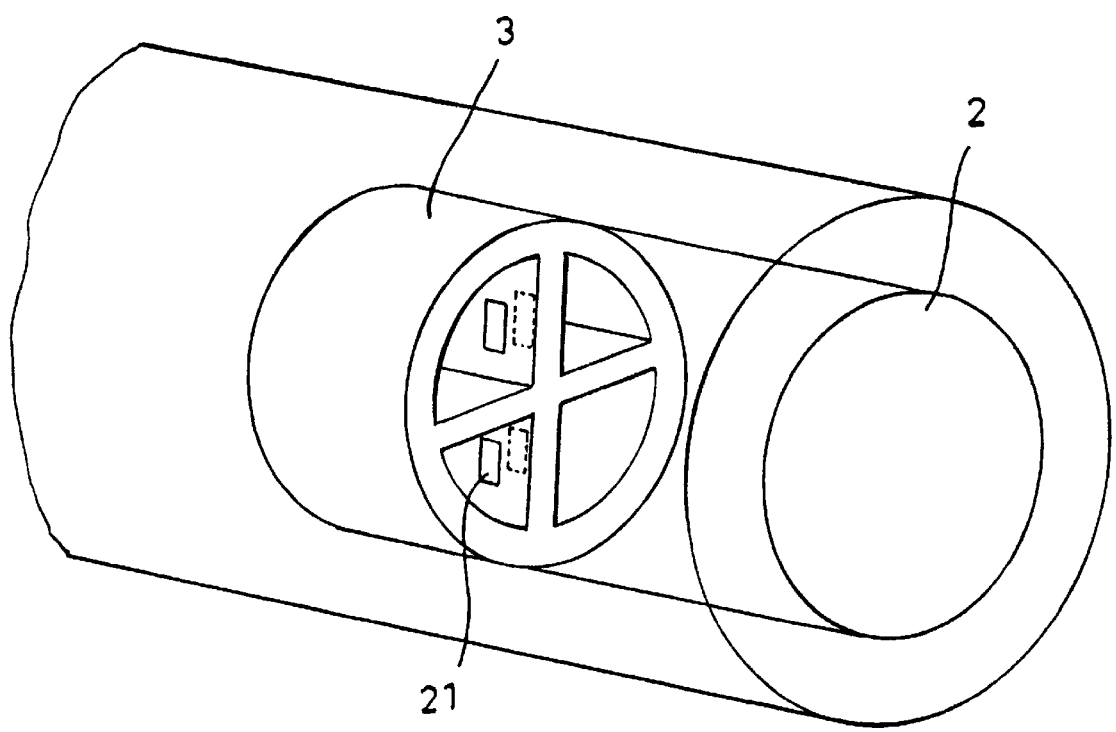
FIG. 21 is a perspective view showing the prior art embedded load converter.

The foregoing is an example and the known load converter (load cell) shown in FIG. 21 can be used directly embedded in lieu of the above stress detection sensor 3. Based on the principle of installing a stress detection sensor in a hole and measuring the strain generated in an object or the load acting on the object and particularly by modifying or amplifying the foregoing specific examples of measuring the force, torque or coefficient of friction acting on the wheel at the axle, devices for measuring a diversity of stresses in various objects or devices in order to measure a diversity of loads, torques, etc. acting on such object can be implemented. The scope of the patent is not limited to the specific examples described herein.

What is claimed is:

1. A device for measuring action force of a wheel comprising:

a vehicle axle is formed with a hole therein and has a natural stress axis;

a stress detection sensor installed in said hole and secured therein through contact between lateral sides of said stress detection sensor and an inner surface of said hole, said stress detection sensor being aligned with or proximate said neutral stress axis such that axle torque effect on said stress detection sensor is minimized;

said stress detection sensor being an integral unit comprising said strain gauges mounted on a cubic plastic base;

a spacing means for potting said stress detection sensor in said hole;

a signal processing circuit for processing said detection signal from said stress detection sensor to minimize an axle torque component;

a cylindrical housing containing said signal processing circuit and secured in said hole by said spacing means;

wiring means for interconnecting said signal processing means with outputs of said stress detection sensor within said hole; and output means for permitting said signal processing circuit to output a stress detection signal from said hole.

* * * * *